(12) United States Patent
Morris et al.

(10) Patent No.: US 11,725,582 B1
(45) Date of Patent: Aug. 15, 2023

(54) MOBILE ELECTRIC POWER GENERATION SYSTEM

(71) Applicant: Typhon Technology Solutions (U.S.), LLC, The Woodlands, TX (US)

(72) Inventors: Jeffrey G. Morris, The Woodlands, TX (US); Brett Vann, The Woodlands, TX (US)

(73) Assignee: Typhon Technology Solutions (U.S.), LLC, The Woodlands, TX (US)

( * ) Notice: Subject to any disclaimer, the term of this patent is extended or adjusted under 35 U.S.C. 154(b) by 0 days.

(21) Appl. No.: 17/732,280

(22) Filed: Apr. 28, 2022

(51) Int. Cl.
*F02C 7/24* (2006.01)
*H02K 7/18* (2006.01)
(Continued)

(52) U.S. Cl.
CPC ............... *F02C 7/05* (2013.01); *F02C 7/20* (2013.01); *F02C 7/24* (2013.01); *H02K 7/1823* (2013.01);
(Continued)

(58) Field of Classification Search
CPC ...... F02C 7/05; F02C 7/20; F02C 7/24; F02C 6/00; F02C 7/052; F02C 7/055;
(Continued)

(56) References Cited

U.S. PATENT DOCUMENTS 3,791,682 A  2/1974 Mitchell
3,837,179 A  9/1974 Barth
(Continued)

FOREIGN PATENT DOCUMENTS

AR  087298 A1  3/2014
AR  092923 A1  5/2015
(Continued)

OTHER PUBLICATIONS

APR Energy. "TM2500 GEN8 Mobile Gas Turbine." APR Energy Product Profile, Oct. 2017, 2 pages.
(Continued)

*Primary Examiner* — J. Todd Newton
(74) *Attorney, Agent, or Firm* — Fenwick & West LLP

(57) ABSTRACT

A system for providing mobile electric power includes a first transport including an inlet plenum and a generator, a second transport including a gas turbine, and a turbine exhaust unit, and a third transport including a generator exhaust air handling system, a combustion air handling system, and a turbine enclosure air handling system. The first transport, the second transport, and the third transport are separate transports that are independently movable in a transportation mode. In an operation mode, the first transport and the second transport are connected to each other such that a first end side of the first transport faces and is connected to a first end side of the second transport, and the inlet plenum mounted on the first transport is connected to an intake of the gas turbine mounted on the second transport. In the operation mode, the third transport is positioned at a predetermined distance relative to the connected first and second transports such that a first longitudinal side of the third transport faces a first longitudinal side of the first transport and a first longitudinal side of the second transport.

32 Claims, 18 Drawing Sheets

(51) Int. Cl.
    *F01D 15/00*     (2006.01)
    *F02C 7/05*     (2006.01)
    *F02C 7/20*     (2006.01)
    *E21B 41/00*     (2006.01)

(52) U.S. Cl.
    CPC ......... E21B 41/0085 (2013.01); F01D 15/00 (2013.01); F05D 2220/76 (2013.01); F05D 2230/644 (2013.01); F05D 2240/90 (2013.01); F05D 2260/30 (2013.01); F05D 2260/607 (2013.01); F05D 2260/608 (2013.01); F05D 2260/96 (2013.01)

(58) Field of Classification Search
    CPC ......... F02C 3/04; F02C 7/32; E21B 41/0085; E21B 7/02; E21B 7/052; E21B 43/16; F05D 2220/76; F05D 2230/644; F05D 2240/90; F05D 2260/30; F05D 2260/607; F05D 2260/608; F05D 2260/96; F01D 15/00; F01D 15/10; F01D 25/28; F01D 25/30
    See application file for complete search history.

(56) References Cited

U.S. PATENT DOCUMENTS

| | | | |
|---|---|---|---|
| 4,100,822 A | 7/1978 | Rosman | |
| 4,159,180 A | 6/1979 | Cooper et al. | |
| 4,272,224 A | 6/1981 | Kabele | |
| 4,311,395 A | 1/1982 | Douthitt et al. | |
| 4,341,508 A | 7/1982 | Rambin | |
| 6,007,227 A | 12/1999 | Carlson | |
| 6,142,878 A | 11/2000 | Barin | |
| 6,334,746 B1 | 1/2002 | Nguyen et al. | |
| 6,398,521 B1 | 6/2002 | Yorulmazoglu | |
| 6,765,304 B2 | 7/2004 | Baten et al. | |
| 6,773,238 B1 | 8/2004 | Sprakel | |
| 6,786,051 B2 | 9/2004 | Kristich et al. | |
| 6,907,737 B2 | 6/2005 | Mittricker et al. | |
| 7,114,322 B2 | 10/2006 | Yamanaka et al. | |
| 7,581,379 B2 | 9/2009 | Yoshida et al. | |
| 7,608,935 B2 | 10/2009 | Scherzer | |
| 7,683,499 B2 | 3/2010 | Saucier | |
| 7,819,209 B1 | 10/2010 | Bezner | |
| 7,921,914 B2 | 4/2011 | Bruins et al. | |
| 8,083,504 B2 | 12/2011 | Williams et al. | |
| 8,587,136 B2 | 11/2013 | Williams | |
| 8,789,601 B2 | 7/2014 | Broussard et al. | |
| 8,997,904 B2 | 4/2015 | Cryer et al. | |
| 9,091,215 B2 | 7/2015 | Baten et al. | |
| 9,103,193 B2 | 8/2015 | Coli et al. | |
| 9,121,257 B2 | 9/2015 | Coli et al. | |
| 9,140,110 B2 | 9/2015 | Coli et al. | |
| 9,395,049 B2 | 7/2016 | Vicknair et al. | |
| 9,475,020 B2 | 10/2016 | Coli et al. | |
| 9,475,021 B2 | 10/2016 | Coli et al. | |
| 9,534,473 B2 | 1/2017 | Morris et al. | |
| 9,945,365 B2 | 4/2018 | Hernandez et al. | |
| 10,107,084 B2 | 10/2018 | Coli et al. | |
| 10,107,085 B2 | 10/2018 | Coli et al. | |
| 10,118,194 B2 | 11/2018 | Kobayashi et al. | |
| 10,124,353 B1 | 11/2018 | Bottiger et al. | |
| 10,184,397 B2 * | 1/2019 | Austin | F02C 6/00 |
| 10,221,668 B2 | 3/2019 | Coli et al. | |
| 10,227,855 B2 | 3/2019 | Coli et al. | |
| 10,378,326 B2 | 8/2019 | Morris et al. | |
| 10,502,042 B2 | 12/2019 | Coli et al. | |
| 10,519,730 B2 * | 12/2019 | Morris | E21B 21/062 |
| 10,648,312 B2 | 5/2020 | Coli et al. | |
| 10,689,961 B2 | 6/2020 | Coli et al. | |
| 10,704,472 B2 | 7/2020 | Davis | |
| 10,774,630 B2 | 9/2020 | Coli et al. | |
| 10,837,270 B2 | 11/2020 | Coli et al. | |
| 10,851,634 B2 | 12/2020 | Coli et al. | |
| 10,876,386 B2 | 12/2020 | Coli et al. | |
| 10,895,138 B2 | 1/2021 | Coli et al. | |
| 10,962,305 B2 * | 3/2021 | Morris | F28D 21/001 |
| 11,168,554 B2 * | 11/2021 | Morris | F04B 23/04 |
| 2002/0002101 A1 | 1/2002 | Hayashi | |
| 2003/0057704 A1 | 3/2003 | Baten et al. | |
| 2003/0079479 A1 * | 5/2003 | Kristich | F01D 15/10 60/797 |
| 2004/0104577 A1 | 6/2004 | Alger et al. | |
| 2005/0029476 A1 | 2/2005 | Biester et al. | |
| 2006/0080971 A1 | 4/2006 | Smith et al. | |
| 2006/0225402 A1 * | 10/2006 | Kierspe | F02C 3/30 60/39.5 |
| 2006/0254281 A1 | 11/2006 | Badeer et al. | |
| 2006/0260331 A1 | 11/2006 | Andreychuk | |
| 2007/0099476 A1 | 5/2007 | Hahlbeck | |
| 2007/0132243 A1 | 6/2007 | Wurtele et al. | |
| 2008/0044298 A1 | 2/2008 | Laski | |
| 2008/0064569 A1 | 3/2008 | Baxter et al. | |
| 2008/0264625 A1 | 10/2008 | Ochoa | |
| 2008/0267785 A1 | 10/2008 | Cervenka et al. | |
| 2009/0068031 A1 | 3/2009 | Gambier et al. | |
| 2009/0009251 A1 | 4/2009 | Williams et al. | |
| 2009/0084558 A1 | 4/2009 | Bloom | |
| 2009/0308602 A1 | 12/2009 | Bruins et al. | |
| 2010/0038907 A1 | 2/2010 | Hunt et al. | |
| 2010/0071561 A1 | 3/2010 | Marwitz et al. | |
| 2010/0132949 A1 | 6/2010 | DeFosse et al. | |
| 2011/0088391 A1 | 4/2011 | Sumser | |
| 2011/0236225 A1 | 9/2011 | Leugemors et al. | |
| 2011/0247334 A1 | 10/2011 | Alexander | |
| 2012/0153634 A1 | 6/2012 | Williams | |
| 2012/0255734 A1 | 10/2012 | Coli et al. | |
| 2013/0045117 A1 | 2/2013 | Wishart | |
| 2013/0306322 A1 | 11/2013 | Sanborn et al. | |
| 2014/0009697 A1 | 1/2014 | Kuromizu | |
| 2014/0096974 A1 | 4/2014 | Coli et al. | |
| 2014/0138079 A1 | 5/2014 | Broussard et al. | |
| 2014/0158345 A1 | 6/2014 | Jang et al. | |
| 2014/0174717 A1 | 6/2014 | Broussard et al. | |
| 2014/0219824 A1 | 8/2014 | Burnette | |
| 2015/0027712 A1 | 1/2015 | Vicknair et al. | |
| 2015/0068724 A1 | 3/2015 | Coli et al. | |
| 2015/0068754 A1 | 3/2015 | Coli et al. | |
| 2015/0211524 A1 | 7/2015 | Broussard et al. | |
| 2015/0252661 A1 | 9/2015 | Glass | |
| 2015/0275891 A1 | 10/2015 | Chong | |
| 2015/0300145 A1 | 10/2015 | Coli et al. | |
| 2015/0300291 A1 | 10/2015 | Yamanaka et al. | |
| 2015/0300336 A1 | 10/2015 | Hernandez et al. | |
| 2015/0314255 A1 | 11/2015 | Coli et al. | |
| 2016/0032703 A1 | 2/2016 | Broussard et al. | |
| 2016/0075387 A1 * | 3/2016 | Fong | B60D 1/64 403/14 |
| 2016/0177675 A1 | 6/2016 | Morris et al. | |
| 2016/0177678 A1 * | 6/2016 | Morris | H02K 7/1823 60/772 |
| 2016/0208593 A1 | 7/2016 | Coli et al. | |
| 2016/0208594 A1 | 7/2016 | Coli et al. | |
| 2016/0326854 A1 | 11/2016 | Broussard et al. | |
| 2016/0326855 A1 | 11/2016 | Coli et al. | |
| 2016/0369609 A1 | 12/2016 | Morris et al. | |
| 2017/0016433 A1 | 1/2017 | Chong et al. | |
| 2017/0036178 A1 | 2/2017 | Coli et al. | |
| 2017/0037718 A1 | 2/2017 | Coli et al. | |
| 2017/0104389 A1 | 4/2017 | Morris et al. | |
| 2017/0129338 A1 | 5/2017 | Cryer et al. | |
| 2017/0259227 A1 | 9/2017 | Morris et al. | |
| 2017/0314380 A1 | 11/2017 | Oehring et al. | |
| 2018/0041093 A1 * | 2/2018 | Miranda | H02K 7/1823 |
| 2018/0328279 A1 | 11/2018 | Austin et al. | |
| 2018/0363434 A1 | 12/2018 | Coli et al. | |
| 2018/0363435 A1 | 12/2018 | Coli et al. | |
| 2018/0363436 A1 | 12/2018 | Coli et al. | |
| 2018/0363437 A1 | 12/2018 | Coli et al. | |
| 2018/0363438 A1 | 12/2018 | Coli et al. | |
| 2019/0055827 A1 | 2/2019 | Coli et al. | |
| 2019/0112908 A1 | 4/2019 | Coli et al. | |
| 2019/0169971 A1 | 6/2019 | Oehring et al. | |

(56) References Cited

U.S. PATENT DOCUMENTS

| | | | |
|---|---|---|---|
| 2019/0211661 | A1 | 7/2019 | Reckels et al. |
| 2019/0271218 | A1 | 9/2019 | Coli et al. |
| 2019/0277125 | A1 | 9/2019 | Coli et al. |
| 2019/0277126 | A1 | 9/2019 | Coli et al. |
| 2019/0277127 | A1 | 9/2019 | Coli et al. |
| 2019/0277128 | A1 | 9/2019 | Coli et al. |
| 2019/0356199 | A1 | 11/2019 | Morris et al. |
| 2020/0318467 | A1 | 10/2020 | Coli et al. |
| 2020/0347710 | A1 | 11/2020 | Coli et al. |
| 2020/0347711 | A1 | 11/2020 | Coli et al. |
| 2020/0408144 | A1* | 12/2020 | Feng .................. E21B 43/2607 |
| 2021/0025324 | A1 | 1/2021 | Morris et al. |
| 2021/0071574 | A1 | 3/2021 | Feng et al. |

FOREIGN PATENT DOCUMENTS

| | | | |
|---|---|---|---|
| AR | 104823 | A2 | 8/2017 |
| AR | 104824 | A2 | 8/2017 |
| AR | 104825 | A2 | 8/2017 |
| AR | 104826 | A2 | 8/2017 |
| CA | 2955706 | A1 | 10/2012 |
| CA | 2639418 | C | 4/2014 |
| CA | 2773843 | C | 1/2016 |
| CA | 2835904 | C | 2/2017 |
| CA | 2845347 | C | 6/2017 |
| CA | 2900387 | C | 9/2018 |
| CN | 1816684 | A | 8/2006 |
| CN | 101910567 | A | 10/2010 |
| CN | 102171060 | A | 8/2011 |
| CN | 103375255 | A | 10/2013 |
| CN | 203685377 | U | 7/2014 |
| EP | 1574714 | B1 | 1/2008 |
| EP | 2678638 | A1 | 1/2014 |
| EP | 2904200 | A1 | 8/2015 |
| EP | 2726705 | B1 | 8/2018 |
| EP | 3444430 | A1 | 2/2019 |
| EP | 3444431 | A1 | 2/2019 |
| EP | 3444432 | A1 | 2/2019 |
| EP | 3447239 | A1 | 2/2019 |
| EP | 3453827 | A2 | 3/2019 |
| EP | 3456915 | A1 | 3/2019 |
| MX | 358054 | B | 8/2018 |
| MX | 362628 | B | 1/2019 |
| MX | 365888 | B | 6/2019 |
| MX | 365889 | B | 6/2019 |
| MX | 366049 | B | 6/2019 |
| WO | WO 2012/137068 | A2 | 10/2012 |
| WO | WO 2014/053056 | A1 | 4/2014 |
| WO | WO 2014/102127 | A1 | 7/2014 |
| WO | WO 2015/162427 | A2 | 10/2015 |
| WO | WO 2019/045687 | A1 | 3/2019 |

OTHER PUBLICATIONS

EE Publishers. "Mobile Gas Turbine Units Fill the Gap for Fast Power." EE Publishers, 3 pages, 2020, [Online] [Retrieved Jul. 21, 2021], Retrieved from the internet <URL:https://www.ee.co.za/article/mobile-gas-turbine-units-fill-gap-fast-power.html>.

Power Engineering International. "Distributed Generation: On the Move." Powerengineeringint.com, 7 pages, May 1, 2001, [Online] [Retrieved Jul. 21, 2021], Retrieved from the internet <URL:https://www.powerengineeringint.com/world-regions/europe/distributed-generation-on-the-move/>.

Siemens. "SGT-A45 Mobile Unit: Immediate Power to the Grid—Highest Power Density, Trusted Technology." Siemens AG, Power and Gas Division, Article No. PGDG-T10034-02-7600, 2018, pp. 1-2.

AR Second Office Action dated Dec. 17, 2020 issued in the prosecution of Argentina Patent Application No. 20160102674 (210AR01), 4 pages.

China National Intellectual Property Administration, Notification to Grant Patent Right for Invention, Chinese Patent Application No. 201910721166.5, dated Jul. 15, 2022, 3 pages.

China National Intellectual Property Administration, Second Office Action, Chinese Patent Application No. 201910721166.5, dated Mar. 16, 2022, 22 pages.

EPO Extended Search Report dated Oct. 15, 2018, in the prosecution of European Application No. 15870991.5, 13 pages.

Extended Search Report for European application No. 20156440.8 dated Sep. 3, 2020, 7 pages.

Gardner Denver Inc., "Well Servicing Pump, Model GD-25000, GD0-25000-HD, Quintuplex Pumps, GWS Fluid End Parts List", 302FWF997 Rev H, Jul. 2008, 39 pages, Tulsa, OK.

Gardner Denver, "C-2500 Quintuplex Well Service Pump", www.gardenerdenver.com, Dec. 7, 2018, 2 pages.

Gardner Denver, Inc., "GD-2500 Quintuplex Well Service Pump", 2003, 2 pages, USA.

Gardner Denver, Inc., "Well Servicing Pump, Model GD-25000 Quintuplex, Power End Parts List", 300FWF997 Rev G, Apr. 2007, 15 pages, Tulsa, OK.

Gardner Denver, Inc., Well Servicing Pump, Model GD-25000 Quintuplex, Operating and Service Manual, 300FWF996 Revision F, Apr. 2011, 50 pages, Tulsa, OK.

Munyon et al., "The Application of Flexible Coulings for Turbomachinery", Proceedings of 18th Turbomachinery Symposium, Texas A&M University, College Station, Texas 1989, pp. 1-11.

PCT International Search Report and the Written Opinion of the International Searching Authority, Or the Declaration, issued in the prosecution of application No. PCT/US16/4977, dated Nov. 21, 2016, 9 pages.

PCT International Search Report and the Written Opinion of the International Searching Authority, Or the Declaration, issued in the prosecution of application No. PCT/US15/66114, dated May 25, 2016, 8 pages.

PCT International Search Report and the Written Opinion of the International Searching Authority, Or the Declaration, issued in the prosecution of application No. PCT/US15/66133, dated Mar. 2, 2016, 9 pages.

PCT International Search Report and Written Opinion, PCT Application No. PCT/US2022/027156, dated Jul. 27, 2022, 14 pages.

Powerpoint Presentation, "TM2500 & TM2500+ Mobile Gas Turbine Generator", from www.scawa.com/files/ SCA_TM2500.pdf., Oct. 9, 2014, 24 pages.

Schlumberger Oilfield Glossary, "Triplex Pump", accessed Apr. 9, 2021, via www.glossary.oilfield.com, 1 page.

United States Office Action, U.S. Appl. No. 17/379,722, dated Jun. 29, 2022, 48 pages.

* cited by examiner

Transportation Mode

Operation Mode

MOBILE ELECTRIC POWER GENERATION SYSTEM

TECHNICAL FIELD

Embodiments of the invention generally relate to mobile electric power generation, and more particularly to a gas turbine based mobile electric power generation system.

BACKGROUND

Hydraulic fracturing has been commonly used by the oil and gas industry to stimulate production of hydrocarbon wells, such as oil and/or gas wells. Hydraulic fracturing, sometimes called "fracing" or "fracking," is the process of injecting fracturing fluid, which is typically a mixture of water, sand, and chemicals, into the subsurface to fracture the subsurface geological formations and release otherwise encapsulated hydrocarbon reserves. The fracturing fluid is typically pumped into a wellbore at a relatively high pressure sufficient to cause fissures within the underground geological formations. Specifically, once inside the wellbore, the pressurized fracturing fluid is pressure pumped down and then out into the subsurface geological formation to fracture the underground formation. A fluid mixture that may include water, various chemical additives, and proppants (e.g., sand or ceramic materials) can be pumped into the underground formation to fracture and promote the extraction of the hydrocarbon reserves, such as oil and/or gas. For example, the fracturing fluid may comprise a liquid petroleum gas, linear gelled water, gelled water, gelled oil, slick water, slick oil, poly emulsion, foam/emulsion, liquid carbon dioxide, nitrogen gas, and/or binary fluid and acid.

Implementing large-scale fracturing operations at well sites typically require extensive investment in equipment, labor, and fuel. For instance, a typical fracturing operation uses a variety of fracturing equipment, numerous personnel to operate and maintain the fracturing equipment, large amounts of fuel to power the fracturing operations, and large volumes of fracturing fluids. As such, planning for fracturing operations is often complex and encompasses a variety of logistical challenges that include minimizing the on-site area or "footprint" of the fracturing operations, providing adequate power and/or fuel to continuously power the fracturing operations, increasing the efficiency of the hydraulic fracturing equipment, and reducing any environmental impact resulting from fracturing operations. Thus, numerous innovations and improvements of existing fracturing technology are needed to address the variety of complex and logistical challenges faced in today's fracturing operations.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system for providing mobile electric power includes: a first transport including an inlet plenum and a generator; a second transport including a gas turbine, and a turbine exhaust unit; and a third transport including a generator exhaust air handling system, a combustion air handling system, and a turbine enclosure air handling system, where the first transport, the second transport, and the third transport are separate transports that are independently movable in a transportation mode, where, in an operation mode, the first transport and the second transport are connected to each other such that a first end side of the first transport faces and is connected to a first end side of the second transport, and the inlet plenum mounted on the first transport is connected to an intake of the gas turbine mounted on the second transport, and where, in the operation mode, the third transport is positioned at a predetermined distance relative to the connected first and second transports such that a first longitudinal side of the third transport faces a first longitudinal side of the first transport and a first longitudinal side of the second transport.

In another embodiment, a method is provided of converting a mobile source of electricity from a transportation mode to an operation mode. the mobile source of electricity comprising a first transport including an inlet plenum and a generator, a second transport including a gas turbine and a turbine exhaust unit, and a third transport including a generator exhaust air handling system, a combustion air handling system, and a turbine enclosure air handling system. The method comprises: backing the second transport into the first transport such that a base frame of the second transport is mated with and slides into a guide rail disposed on a base frame of the first transport, and such that a first end side of the second transport is connected and locked with a first end side of the first transport; coupling, with a coupling member, an intake of the gas turbine disposed on a sub-frame pivotally mounted to the base frame of the second transport to the inlet plenum disposed on the first transport, to thereby combine and lock the first and second transports into a combined first and second transport; performing an automatic leveling operation for the combined first-and-second transport by operating a plurality of inclinometers to obtain sensor data, and operating a plurality of actuators based on the obtained sensor data to move a plurality of support feet disposed on the first and second transports; and performing an automatic precise alignment operation for the combined first-and-second transport by utilizing one or more sensors disposed at one or more locations of the first and second transports to obtain sensor data, and controlling a pivoting mechanism based on the obtained sensor data to pivot the sub-frame that mounts the gas turbine on the second transport and precisely align the gas turbine disposed on the second transport to a drive line of the generator disposed on the first transport.

In yet another embodiment, an air handling transport includes: a generator exhaust air handling system including a first air box, a generator exhaust air intake port disposed on a first longitudinal facing side of the air handling transport and fluidly connected to the first air box, a plurality of silencers disposed in an interior of the first air box, and an outlet disposed on a roof of an enclosure of the air handling transport and fluidly connected to the first air box; a combustion air handling system including a second air box, one or more inlets to the second air box, the one or more inlets being disposed on a second longitudinal side of the air handling transport that is opposite to the first longitudinal facing side, a plurality of filters to filter ambient air flowing into the second air box from the one or more inlets thereof, and a combustion air outlet port disposed on the first longitudinal facing side and fluidly connected to the second air box; and a turbine enclosure air handling system including a third air box, one or more inlets to the third air box, the one or more inlets being disposed on the second longitudinal side of the air handling transport, a plurality of filters to filter ambient air flowing into the third air box from the one or more inlets thereof, and a plurality of turbine enclosure and cooling air outlet ports disposed on the first longitudinal facing side and fluidly connected to the third air box, and where the first longitudinal facing side of the air handling transport is adapted to face a first longitudinal facing side of a generator transport and a first longitudinal facing side of a gas turbine transport, where the generator transport, the gas turbine transport, and the air handling transport are separate transports that are independently movable in a transportation mode.

In yet another embodiment, a system for providing mobile electric power includes: a generator transport including an inlet plenum and a generator; a gas turbine transport including a gas turbine and a turbine exhaust unit; and an air handling transport including a generator exhaust air handling system, a combustion air handling system, and a turbine enclosure air handling system, where, in an operation mode, the air handling transport is positioned at a predetermined distance relative to the generator transport and the gas turbine transport such that a first longitudinal side of the air handling transport faces a first longitudinal side of the generator transport and faces a first longitudinal side of the gas turbine transport, where in the operation mode, the system defines a generator exhaust air flow path, a combustion air flow path, and a turbine enclosure ventilation and cooling air flow path, and where the generator exhaust air flow path: begins at a roof of an enclosure of the generator transport, extends through and ventilates an interior of the enclosure of the generator transport, cools radiant heat of the generator disposed in the interior of the enclosure of the generator transport, exits the generator transport through an outlet port disposed on the first longitudinal side of the generator transport, enters the air handling transport through an intake port disposed on the first longitudinal side of the air handling transport, and exits the system through an outlet disposed on a roof of an enclosure of the air handling transport In yet another embodiment, the combustion air flow path: begins at one or more inlets disposed on a second longitudinal side of the air handling transport that is opposite to the first longitudinal side thereof, passes through one or more filters disposed at the one or more inlets to filter incoming air, passes through an interior of a combustion air box defined in the enclosure of the air handling transport, exits the air handling transport through an outlet port of the combustion air box disposed on the first longitudinal side of the air handling transport, enters the generator transport through the inlet plenum disposed on the first longitudinal side of the generator transport, enters the gas turbine transport through an intake of the gas turbine that is coupled to the inlet plenum, passes through the gas turbine on the gas turbine transport. The combustion air flow path then enters a horizontal exhaust disposed on the gas turbine transport and coupled to an outlet of the gas turbine, and exits the system through a roof of an enclosure of the gas turbine transport; or the combustion air flow path enters a vertical exhaust stack connected to the exhaust collector, and exits the system through a top of the vertical exhaust stack.

In yet another embodiment, the turbine enclosure ventilation and cooling air flow path: begins at one or more inlets disposed on the second longitudinal side of the air handling transport, passes through one or more filters disposed at the one or more inlets to filter incoming air, passes through an interior of a turbine enclosure air box defined in the enclosure of the air handling transport, exits the air handling transport through outlet ports of the turbine enclosure air box disposed on the first longitudinal side of the air handling transport, enters the gas turbine transport through intake ports of the enclosure of the gas turbine transport, passes through and ventilates an interior of the enclosure of the gas turbine transport, cools radiated heat from an external surface of the gas turbine disposed in the interior of the enclosure of the gas turbine transport. The turbine enclosure ventilation and cooling air flow path then enters the horizontal exhaust disposed on the gas turbine transport, and exits the system through the roof of the enclosure of the gas turbine transport, or the turbine enclosure ventilation and cooling air flow path flows around an outer surface of the vertical exhaust stack, and exits the system through a peripheral opening on a roof of the enclosure of the gas turbine transport.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
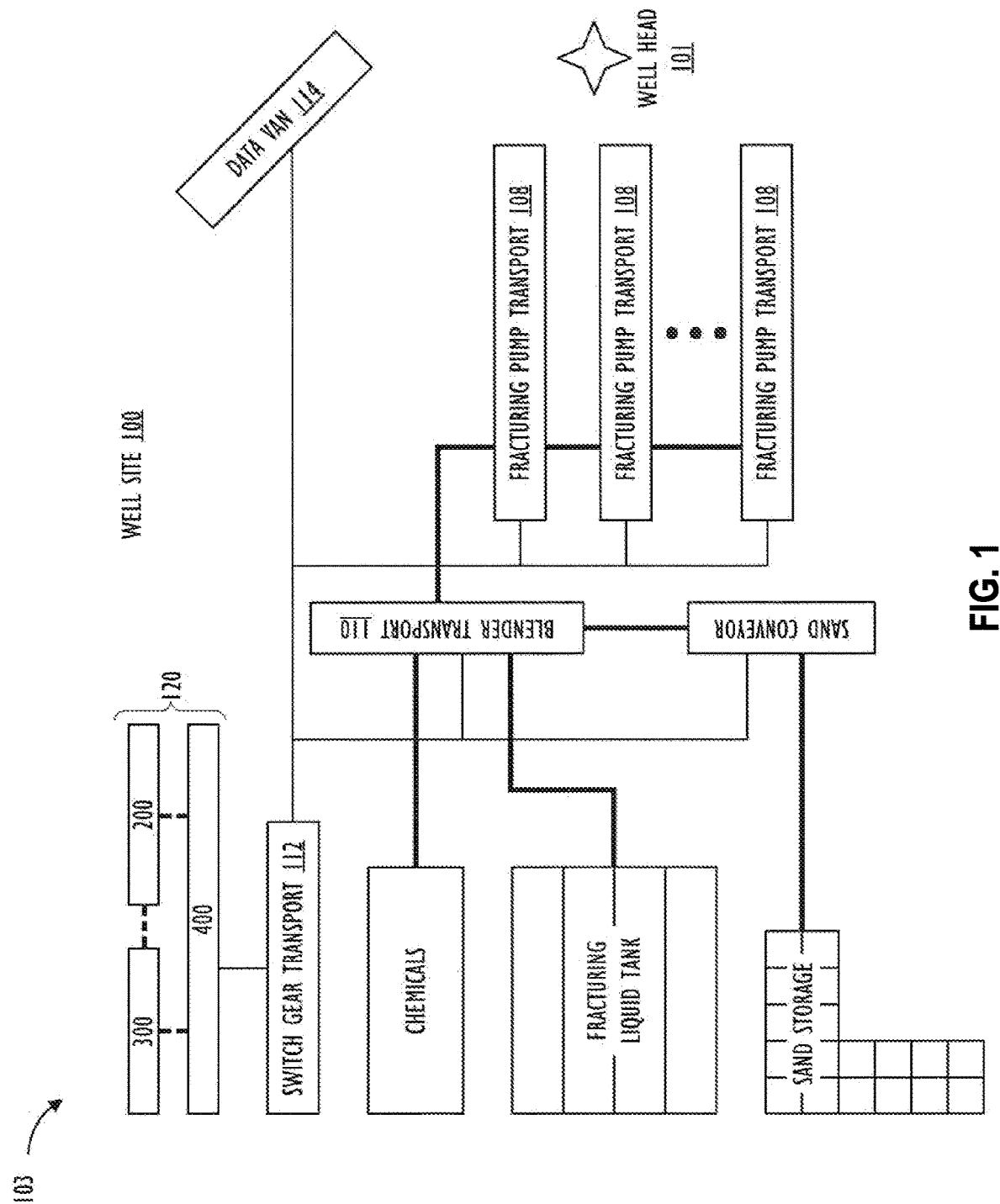
FIG. 1 is a schematic diagram of a mobile hydraulic fracturing system operating at a well site, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure.

DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "transport" refers to any transportation assembly, including, but not limited to, a trailer, truck, skid, and/or barge used to transport relatively heavy structures, such as a gas turbine, a generator, air handling system, and the like.

As used herein, the term "trailer" refers to a transportation assembly used to transport relatively heavy structures, such as a gas turbine, a generator, and the like, that can be attached and/or detached from a transportation vehicle used to pull or move the trailer. In one embodiment, the trailer may include the mounts and manifold systems to connect the trailer to other equipment.

This disclosure pertains to a mobile source of electricity (e.g., mobile electric power generation system, power generation system, and the like) that may be configured to provide mobile electric power for different applications or use cases. The mobile source of electricity may be implemented using a plurality of transports (e.g., three transports). The plurality of transports of the mobile source of electricity may include a generator transport, a gas turbine transport, and an air handling transport. The generator transport (FIG. 2) may include at least a generator, and a gas turbine inlet plenum, the gas turbine transport (FIGS. 3-4) may include at least a gas turbine (e.g., GE LM6000), and gas turbine exhaust, and the air handling transport (FIGS. 5-6) may include at least a combustion air handling system, a turbine enclosure and ventilation air handling system, and a generator exhaust air handling system.

The generator transport, the gas turbine transport, and the air handling transport are separately and independently movable in a transportation mode. During an operation mode, the generator transport, the gas turbine transport, and the air handling transport are connectable to each other without requiring any external mechanical equipment to interconnect the transports. The mobile electric power generation system is thus operable to supply electric power for different applications requiring a mobile source of electricity (e.g., well sites, data centers, agricultural applications, hydraulic fracking, and the like). The mobile electric power generation system may be configured to be 'self-sufficient' such that it can be quickly mobilized and de-mobilized without requiring use of external mechanical equipment or apparatus. For example, the mobile source of electricity may improve mobility by enabling a mobilization and de-mobilization time period of less than 24 hours. The mobile source of electricity may also incorporate a three transport footprint, where the same three transports may be used for transportation and operation modes without requiring any external mechanical equipment for mobilization and/or demobilization. After reaching a remote site where a mobile source of electricity is required, each of the generator transport, the gas turbine transport, and the air handling transport can be quickly converted from the transportation mode to the operation mode by, e.g., positioning and interconnecting the transports, supplying hydrocarbon fuel to the gas turbine, and further making the required electrical interconnect. The gas turbine of the gas turbine transport and the generator of the generator transport may then be operated to generate electricity. After the mobile source of electricity is no longer required at the remote site, the mobile electric power generation system can be quickly mobilized to the transportation mode without use of any external mechanical equipment (e.g., decoupling the three transports from each other). In the operation mode, the power generation system may produce electric power in the range of about 5-60 megawatts (MW) (e.g., 48 MW, 54 MW, and the like).

The mobile source of electricity may have different applications. For example, the power generation system may power electric hydraulic fracturing operations for one or more well sites by providing electric power to a variety of fracturing equipment located at the well sites. The different fracturing equipment, which include, but are not limited to, a blender, hydration unit, fracturing pump transport(s), sand handling equipment, chemical additive system, and the mobile source of electricity, may be configured to operate remotely via a control network system that monitors and controls the fracturing equipment using a communication network. In other embodiments, the mobile electric power generation system may be implemented to provide electric power for other applications (e.g., industrial, mining, commercial, civilian, agricultural, manufacturing, and the like) where mobile electric power is needed and where the requisite hydrocarbon fuel (e.g., natural gas) required to power the gas turbine is available.

FIG. 1 is a schematic diagram of an embodiment of well site 100 which comprises wellhead 101 and mobile fracturing system 103 that relies on mobile electric power generation to power a fracturing operation. Generally, mobile fracturing system 103 may perform fracturing operations to complete a well and/or transform a drilled well into a production well. For example, well site 100 may be a site where operators are in the process of drilling and completing a well. Operators may start the well completion process with drilling, running production casing, and cementing within the wellbore. The operators may also insert a variety of downhole tools into the wellbore and/or as part of a tool string used to drill the wellbore. After the operators drill the well to a certain depth, a horizontal portion of the well may also be drilled and subsequently encased in cement. The operators may subsequently remove the rig, and mobile fracturing system 103 may be moved onto well site 100 to perform fracturing operations that force relatively high pressure fracturing fluid through wellhead 101 into subsurface geological formations to create fissures and cracks within the rock. Fracturing system 103 may be moved off well site 100 once the operators complete the fracturing operations. Typically, fracturing operations for well site 100 may last several days.

To provide an environmentally cleaner and more transportable fracturing fleet, mobile fracturing system 103 may comprise mobile source of electricity 120 (e.g., mobile electric power generation system including generator transport 200, gas turbine transport 300, and air handling transport 400 as described in detail in FIGS. 2-9; system for providing mobile electric power) configured to generate electricity by burning hydrocarbon fuel, such as natural gas, obtained from one or more other sources (e.g., a producing wellhead, tanker, gas pipeline, etc.) at well site 100, from a remote offsite location, and/or another relatively convenient location near mobile source of electricity 120. Improving mobility of mobile fracturing system 103 may be beneficial because fracturing operations at a well site typically last for several days and the fracturing equipment is subsequently removed from the well site after completing fracturing operation. Rather than using fuel that is costly and significantly impacts air quality (e.g., diesel fuel) as a source of power and/or receiving electric power from a grid or other type of stationary power generation facility (e.g., located at the well site or offsite), mobile fracturing system 103 utilizes mobile source of electricity 120 running on natural gas as a power source that may already be freely available at wellsite 100 and that burns cleaner.

The electricity generated by mobile source of electricity 120 may be supplied to fracturing equipment to power fracturing operations at one or more well sites, or to other equipment in various types of applications requiring mobile electric power generation. Mobile source of electricity 120 may include a plurality of transports 200, 300, and 400 are that separately and independently movable in the transportation mode and that are connectable to each other without requiring any external mechanical equipment during the operation mode to produce electricity. Mobile source of electricity 120 is thus easily transportable by operators to different well sites and/or different fracturing jobs and/or different physical locations along with other components of system 103. Although not shown in FIG. 1, mobile source of electricity 120 may be utilized to simultaneously power a plurality of frac fleets to simultaneously frac a plurality of wells at wellsite 100. Configuration and method of operation of mobile source of electricity 120 is described in more detail in connection with FIGS. 2-10. Mobile source of electricity 120 is not limited for use in fracturing operations and may be utilized to power other types of equipment and for other applications (e.g., industrial, mining, commercial, civilian, agricultural, manufacturing, server farms, and the like). The use and discussion of FIG. 1 is only an example to facilitate ease of description and explanation of mobile source of electricity 120.

In addition to mobile source of electricity 120, mobile fracturing system 103 may include switch gear transport 112, at least one blender transport 110, at least one data van 114, and one or more fracturing pump transports 108 that deliver fracturing fluid through wellhead 101 to subsurface geological formations. Switch gear transport 112 may receive electricity generated from mobile source of electric power 120 via one or more electrical connections. In one embodiment, switch gear transport 112 may use 13.8 kilovolts (kV) electrical connections to receive power from mobile source of electricity 120. Switch gear transport 112 may comprise a plurality of electrical disconnect switches, fuses, transformers, and/or circuit protectors to protect the fracturing equipment of system 103. The switch gear transport 112 may transfer the electricity received from the mobile source of electricity 120 to the electrically connected fracturing equipment of mobile fracturing system 103. Switch gear transport 112 may further comprise a control system to control, monitor, and provide power to the electrically connected fracturing equipment.

In one embodiment, switch gear transport 112 may receive an electrical connection at a first voltage and perform one or more voltage step down or voltage step up operations (e.g., using one or more transformers disposed on transport 112) before providing the converted voltage to other fracturing equipment, such as fracturing pump transports 108, blender transport 110, sand storage and conveyor, hydration equipment, chemical equipment, data van 114, lighting equipment, and any additional auxiliary equipment of system 103 used for the fracturing operations. Alternately, switch gear transport 112 may simply pass through a voltage to downstream equipment (e.g., to frac pump transports 108), and the downstream equipment may include one or more transformers to perform any voltage conversion operations (e.g., convert 13.8 kV voltage to lower voltage levels like 4.8 kV, 600 V, and the like) to power downstream frac equipment. In some embodiments, one or more components of switch gear transport 112 may be disposed on one or more of the transports 200, 300, 400 of mobile source of electricity 120, and switch gear transport 112 may be omitted from system 103.

Each fracturing pump transport 108 may receive the electric power from switch gear transport 112 (or from mobile source of electricity 120) to power a prime mover. The prime mover converts electric power to mechanical power for driving one or more pumps. In one embodiment, the prime mover may be a dual shaft electric motor that drives two different pumps. Fracturing pump transport 108 may be arranged such that one pump is coupled to opposite ends of the dual shaft electric motor and avoids coupling the pumps in series. By avoiding coupling the pump in series, fracturing pump transport 108 may continue to operate when either one of the pumps fails or have been removed from fracturing pump transport 108. Additionally, repairs to the pumps may be performed without disconnecting the system manifolds that connect fracturing pump transport 108 to other fracturing equipment within mobile fracturing system 103 and wellhead 101.

Blender transport 110 may receive electric power fed through switch gear transport 112 to power a plurality of electric blenders. A plurality of prime movers may drive one or more pumps that pump source fluid and blender additives (e.g., sand) into a blending tub, mix the source fluid and blender additives together to form fracturing fluid, and discharge the fracturing fluid to fracturing pump transports 108.

Data van 114 may be part of a control system, where data van 114 acts as a control center configured to monitor and provide operating instructions to remotely operate blender transport 110, mobile source of electricity 120, fracturing pump transports 108, and/or other fracturing equipment within mobile fracturing system 103. For example, data van 114 may communicate via the control network system with the variable frequency drives (VFDs) located within system 103 that operate and monitor the health of the electric motors used to drive the pumps on fracturing pump transports 108. In one embodiment, data van 114 may communicate with the variety of fracturing equipment using a control network system that has a ring topology. A ring topology may reduce the amount of control cabling used for fracturing operations and increase the capacity and speed of data transfers and communication. Other fracturing equipment shown in FIG. 1, such as water tanks, chemical storage of chemical additives, hydration unit, sand conveyor, and sandbox storage are known by persons of ordinary skill in the art, and therefore are not discussed in further detail.

Although FIG. 1 describes mobile source of electricity 120 as being part of mobile fracturing system 103 for performing electric hydraulic fracturing operations at well site 101, mobile source of electricity 120 may also be used for any other application where a mobile source of electricity is required. Mobile source of electricity 120 may be configured to be transportable to different locations. Once the mobile source of electricity is no longer required at a given location, it may be easily transported to a new location where such mobile source of electricity is now required. Regardless of the application, the mobile source of electricity may include at least transports 200, 300, and 400, and provide improved mobility during transportation and significant power generation capacity (e.g., 48 MW, 54 MW) during operation.

Figure 2:
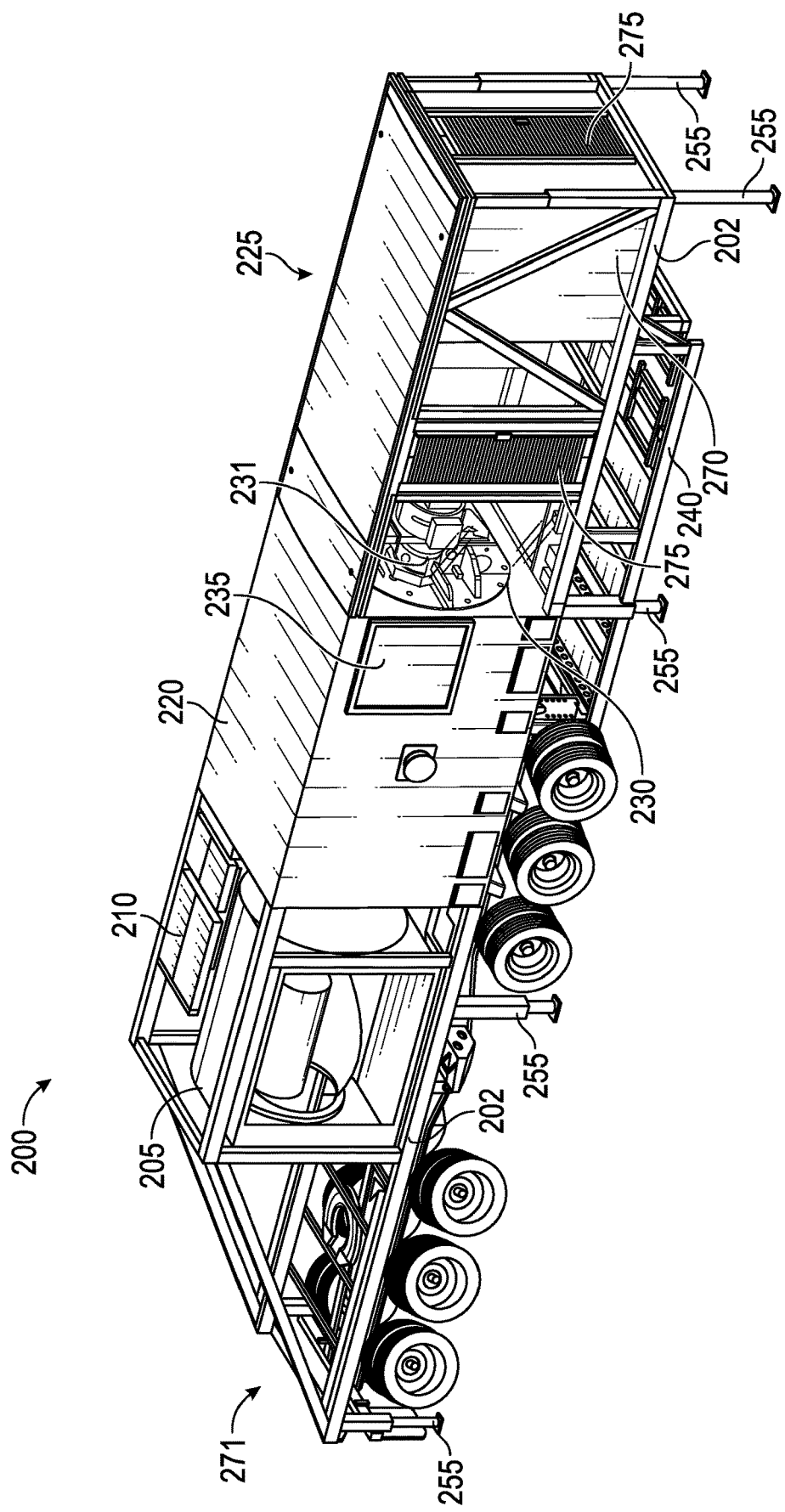
FIG. 2 is a schematic diagram showing a perspective view of a generator transport, in accordance with one or more embodiments.

FIG. 2 is a schematic diagram showing a perspective view of generator transport 200 of mobile source of electricity 120, in accordance with one or more embodiments. The perspective view shown in FIG. 2 illustrates generator transport 200 with an enclosure thereof removed. That is, FIG. 2 depicts components within the enclosure (not shown) of generator transport 200. As shown in FIG. 2, generator transport 200 may include gas turbine inlet plenum 205 (e.g., intake plenum), radiator 210, generator 220, other equipment 225, a plurality of support feet 255, and control system 270. Components not specifically labeled in FIG. 2 but that may be included on generator transport 200 include a generator shaft, a generator breaker, a transformer, a control system, a control room, control cabinets including variable frequency drives (VFDs), switch gear, a fire suppression system, a generator lube oil system, and the like.

Inlet plenum 205 may be configured to collect intake air (e.g., filtered combustion air) from air handling transport 400, and supply the intake air to turbine transport 300 for combustion, when in the operation mode. Radiator 210 may be disposed above inlet plenum 205 and may be a radiator for cooling generator lube oil that is stored in lube oil tanks (not shown) disposed in underbelly truss 240. Generator 220 may be a commercially available generator such as a Brush generator, a WEG generator, or other similar generator configured to generate a compatible amount of electric power based on the capacity of the gas turbine disposed on gas turbine transport 300. For example, generator 220 disposed on generator transport 200 may be configured to generate electric power from a range of about 5 MW to about 60 MW (e.g., 48 MW, 54 MW, and the like). Other types of gas turbine/generator combinations with power ranges greater than about 60 MW or less than about 5 MW may also be used depending on the application requirement.

As shown in FIG. 2, generator 220 has at least one intake 230, and one or more fans 231 may be disposed at intake 230 to input ventilation and cooling air into an interior of generator 220 from air handling transport 400 for ventilating and cooling an interior of generator 220. Transport 200 may further include louver doors 275 provided on sides (e.g., longitudinal side, end side, top side) of generator transport 200 to intake ambient air during the operation mode by operation of fans 231 and cause ambient air to flow via louver doors 275 into an interior of the enclosure of generator transport 200, cool the electronic equipment (e.g., equipment 225) disposed inside the enclosure of generator transport 200, enter the interior of generator 220 via intake 230 and cool the generator 220 interior, and exit out of outlet port 235 that is disposed on a side surface of generator 220 and that is adapted to be fluidly connected to air handling transport 400 during the operation mode. Although FIG. 2 illustrates that transport 200 includes two louver doors 275 for intake of generator ventilation and cooling air, the location and/or number of louver doors 275 is not intended to be limiting. For example, additional or alternative louver doors 275 may be disposed between inlet plenum 205 and generator 220 on the same longitudinal side of transport 200 where outlet port 235 is disposed. As another example, additional or alternative louver doors 275 may be disposed on a roof of an enclosure of transport 200, or on a longitudinal side of transport 200 that is opposite to the longitudinal side of transport 200 where outlet port 235 is disposed. Components of generator transport 200 shown in FIG. 2 may be supported on generator transport 200 by being mounted on engineered base frame 202 of generator transport 200, or on a sub-base, sub-skid, or any other sub-structure of generator transport 200.

Figure 3A:
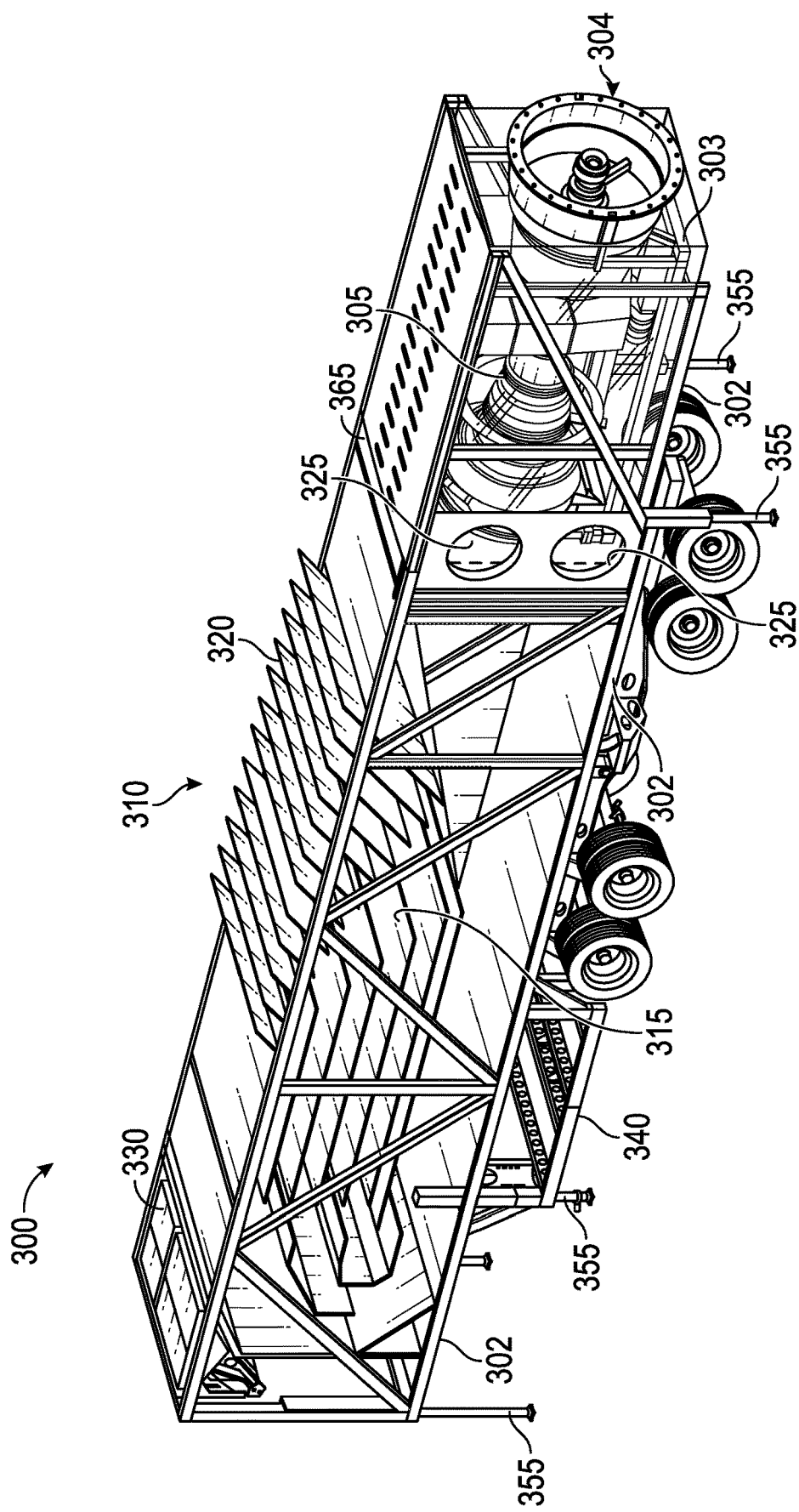
FIGS. 3A-3B are schematic diagrams showing perspective views of a gas turbine transport with a horizontal exhaust, in accordance with one or more embodiments.
Figure 3B:
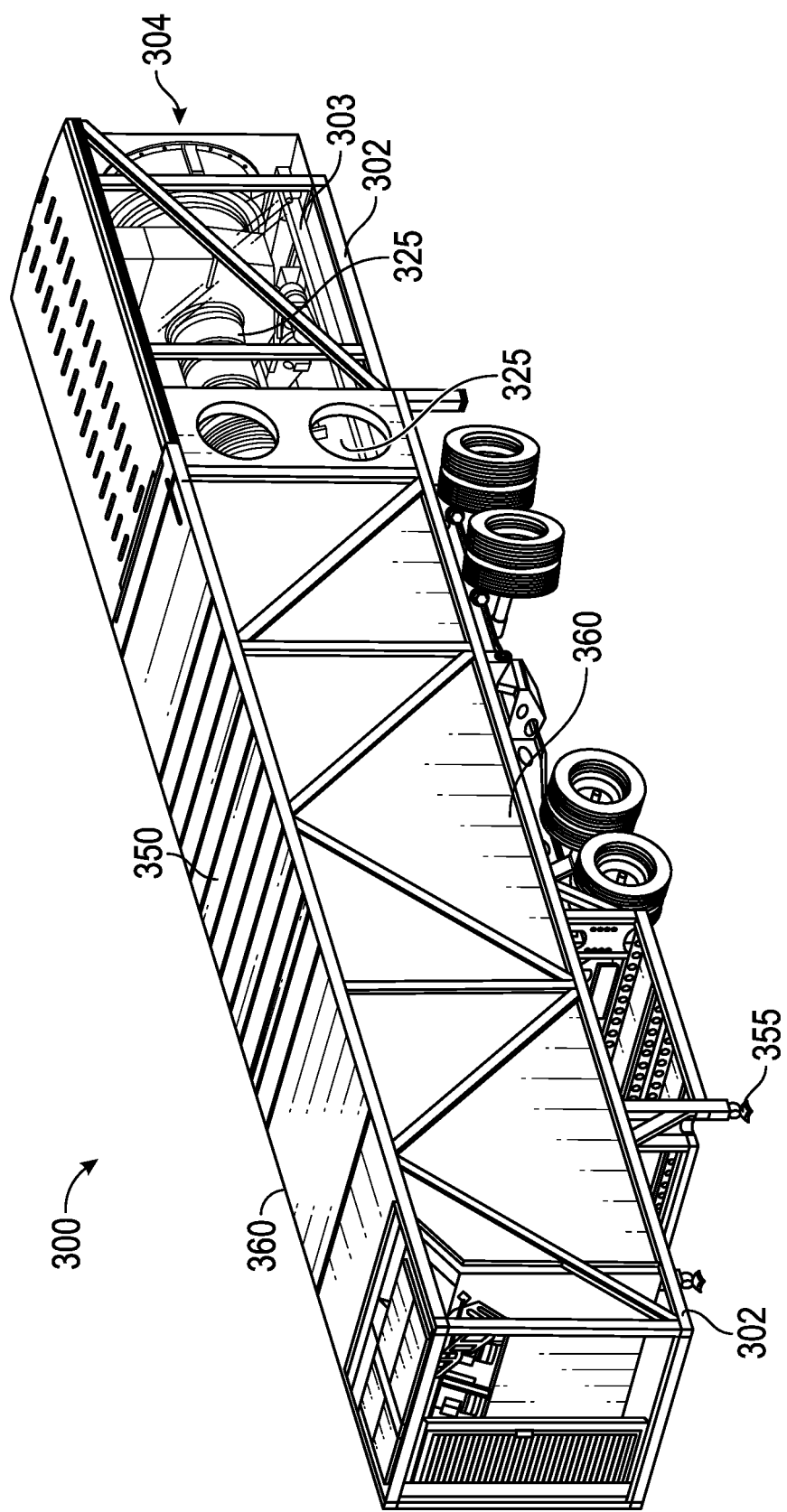
Figure 4A:
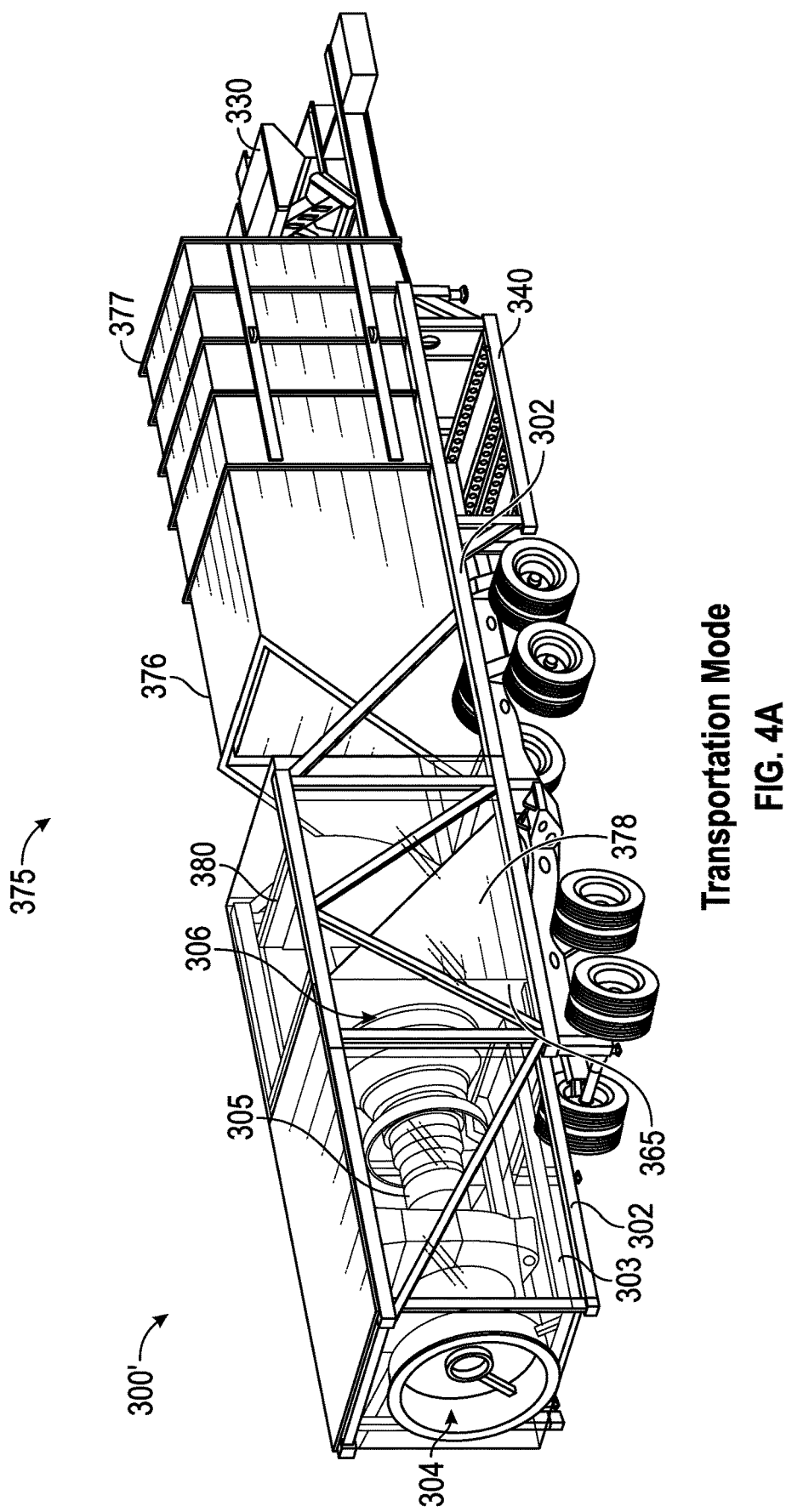
FIGS. 4A-4B are schematic diagrams showing perspective views of a gas turbine transport with a movable exhaust stack, in accordance with one or more embodiments.
Figure 4B:
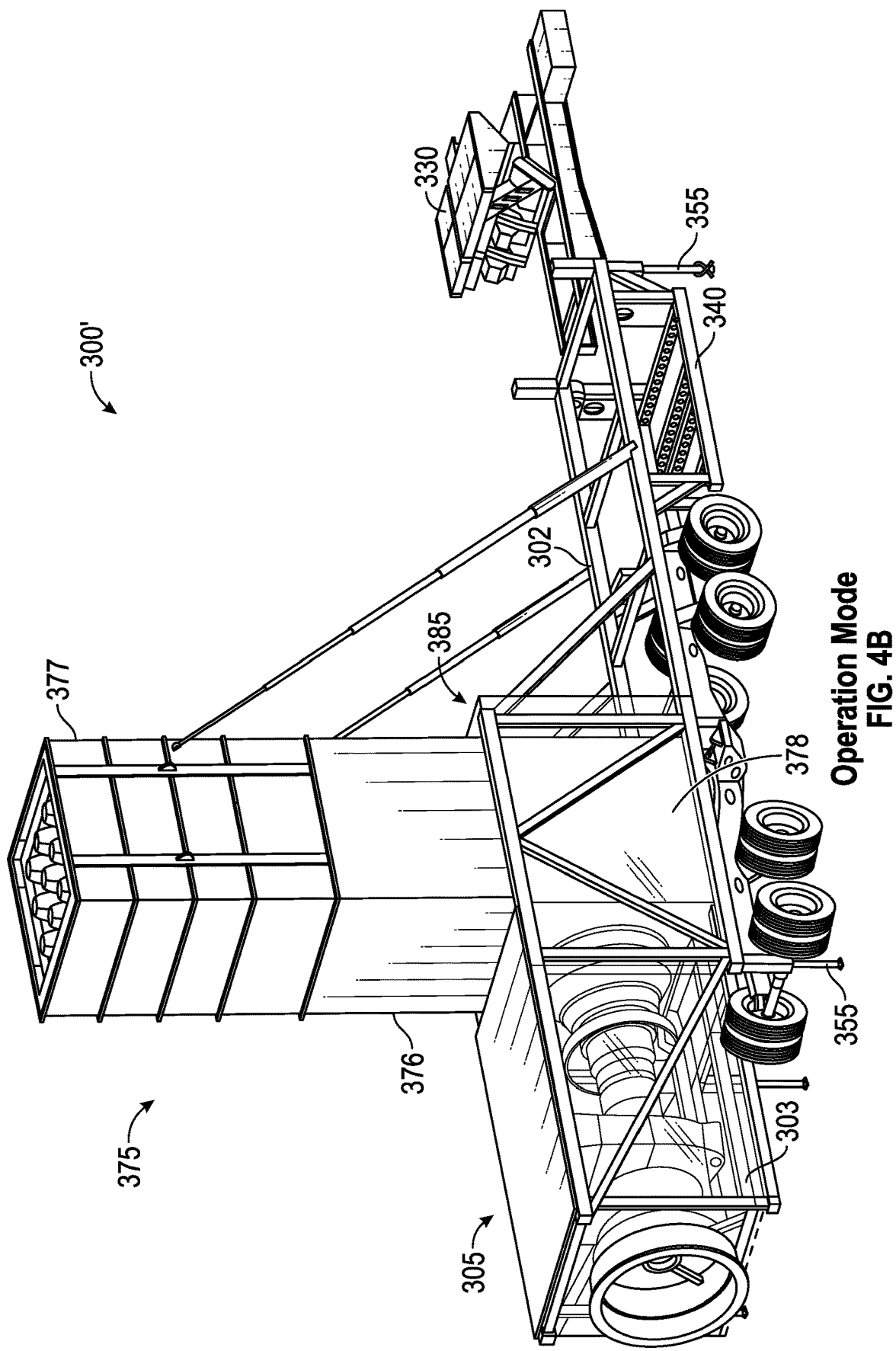

FIGS. 3A-3B are schematic diagrams showing perspective views of gas turbine transport 300 with a fixedly mounted horizontal exhaust 310, in accordance with one or more embodiments, and FIGS. 4A-4B are schematic diagrams showing perspective views of gas turbine transport 300' with a movable exhaust stack 375, in accordance with one or more embodiments. The perspective views shown in FIGS. 3A and 4A-4B illustrate embodiments of gas turbine transport 300, 300' with an enclosure thereof removed. That is, FIGS. 3A and 4A-4B depict components within the enclosure (not shown) of gas turbine transport 300, 300'. Note that the same components in FIGS. 3A-3B, and 4A-4B are denoted by the same reference numerals, and repetition of description thereof is omitted. In addition, to facilitate ease of description and explanation, not all components of transport 300, 300' are shown in each of FIGS. 3A-3B, and 4A-4B. The different views and respective components of transport 300, 300' shown in each of FIGS. 3A-3B, and 4A-4B are to be considered as illustrative and not restrictive, and the intention is not to be limited to the details given herein.

As shown in FIGS. 3A-3B, and 4A-4B, gas turbine transport 300, 300' includes power source 305, and support feet 355. Power source 305 may be a gas turbine or another type of power source (e.g., gas turbine, internal combustion engine, diesel engine, and the like). Power source 305 is hereinafter referred to interchangeably as gas turbine 305. However, as stated above, power source 305 may correspond to other types of turbine or non-turbine-based power sources that are capable of generating sufficient mechanical energy for operating generator 220 at its nameplate rating. Gas turbine 305 may be a turbine to generate mechanical energy (i.e., rotation of a shaft) from a hydrocarbon fuel source, such as natural gas, liquefied natural gas, condensate, and/or other liquid fuels. Although not specifically shown in the figures, in the operation mode, a shaft of gas turbine 305 is connected to generator 220 at an intake-endside (cold-end-side) of the gas turbine 305 such that generator 220 converts the supplied mechanical energy from rotation of the shaft of gas turbine 305 to produce electric power. Gas turbine 305 may be a commercially available gas turbine such as a General Electric gas turbine (e.g., LM6000), a Pratt and Whitney gas turbine, a Siemens gas turbine, a Baker Hughes gas turbine, or any other similar gas turbine. Gas turbine 305 may include inlet 304 and outlet 306 disposed at opposite ends thereof and gas turbine 305 may be supported on gas turbine transport 300, 300' by being mounted on engineered base frame 302, or on sub-base 303, sub-skid, or any other sub-structure of gas turbine transport 300, 300'. In the embodiments shown in FIGS. 3A-3B, and 4A-4B, gas turbine 305 is mounted on sub-base 303 that is in turn pivotally mounted on base frame 302 of gas turbine transport 300, 300' via, e.g., electric motors and screws (e.g., pivoting mechanism). Radiator 330 of FIGS. 3A-3B, and 4A-4B may be a radiator for cooling gas turbine 305 lube oil that is stored in lube oil tanks (not shown) disposed in underbelly truss 340 of gas turbine transport 300, 300'.

As shown in the embodiment of FIGS. 3A-3B, gas turbine transport 300 further includes horizontal exhaust 310 (e.g., turbine exhaust unit) that is fixedly mounted on base frame 302, and that is fluidly coupled to outlet 306 of gas turbine 305 to output exhaust thrust air exiting from gas turbine 305 via outlet 320 of horizontal exhaust 310 disposed at a roof of the enclosure 360 of gas turbine transport 300. As shown in FIG. 3B, louver doors 350 are mounted on the roof of the enclosure 360 of transport 300. Louver doors 350 are operable (e.g., mechanically, electronically, hydraulically, pneumatically, and the like) to remain in a closed position (FIG. 3B) during the transportation mode, and in the operation mode (FIGS. 3A, 7E, 8A-8B) the louver doors 350 can be opened so that the exhaust thrust air exiting from the outlet 306 of gas turbine 305 can exit from outlet 320 of horizontal exhaust 310 at the roof of the enclosure 360 of transport 300, thereby ensuring safety of operating personnel by causing the hot exhaust air to exit the equipment at a height equal to the height of the roof of the enclosure 360 of transport 300 (e.g., height of 13 feet and 6 inches). Further, as shown in FIGS. 3A-3B, horizontal exhaust 310 includes a plurality of silencers 315 disposed in an interior space thereof to reduce noise of the exhaust thrust air as it exits the equipment through louver doors 350.

Figure 8A:
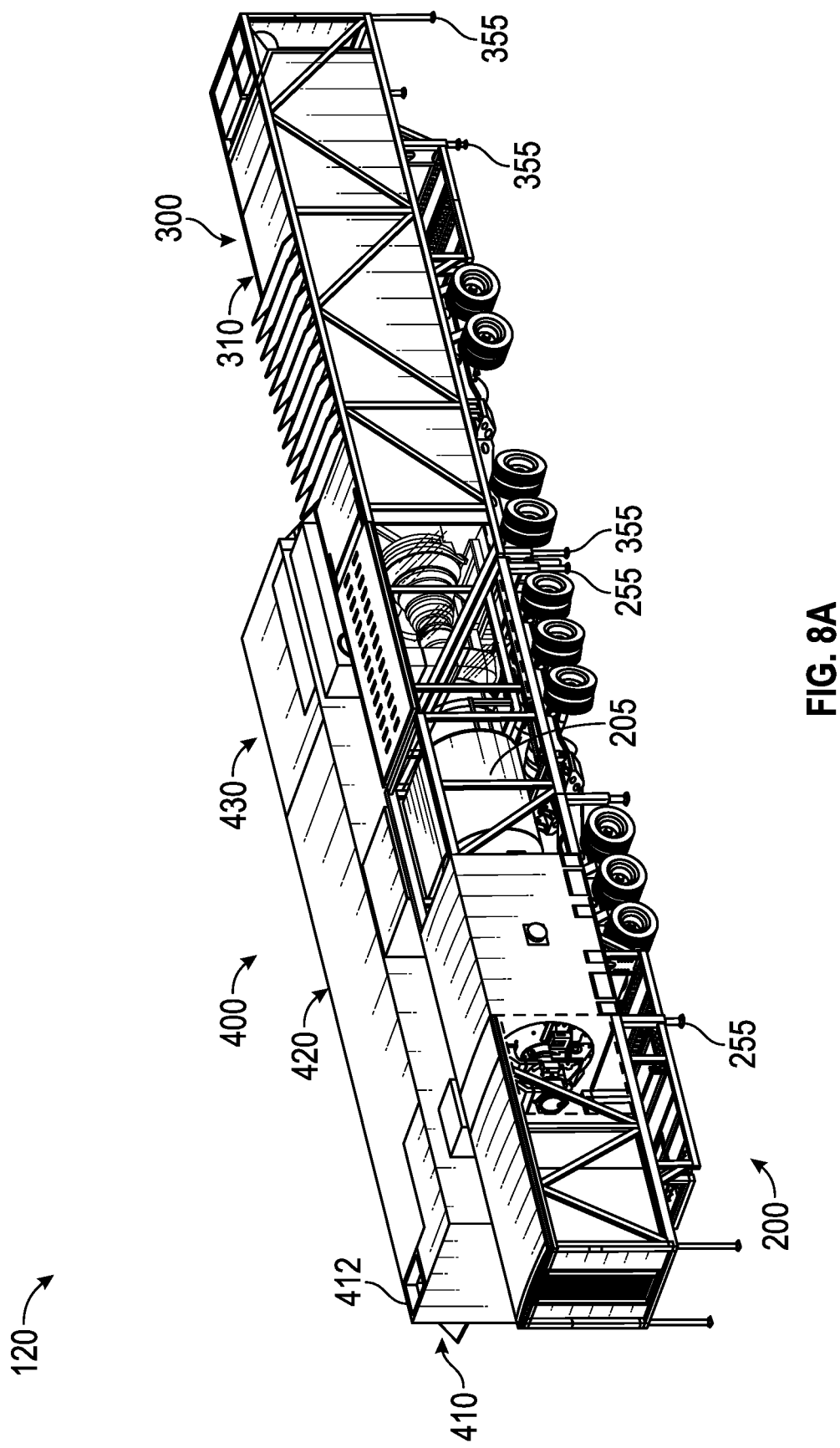
FIGS. 8A-8B are schematic diagrams showing perspective views of the gas turbine transport, the generator transport, and the air handling transport connected to each other in the operation mode, in accordance with one or more embodiments.
Figure 8B:
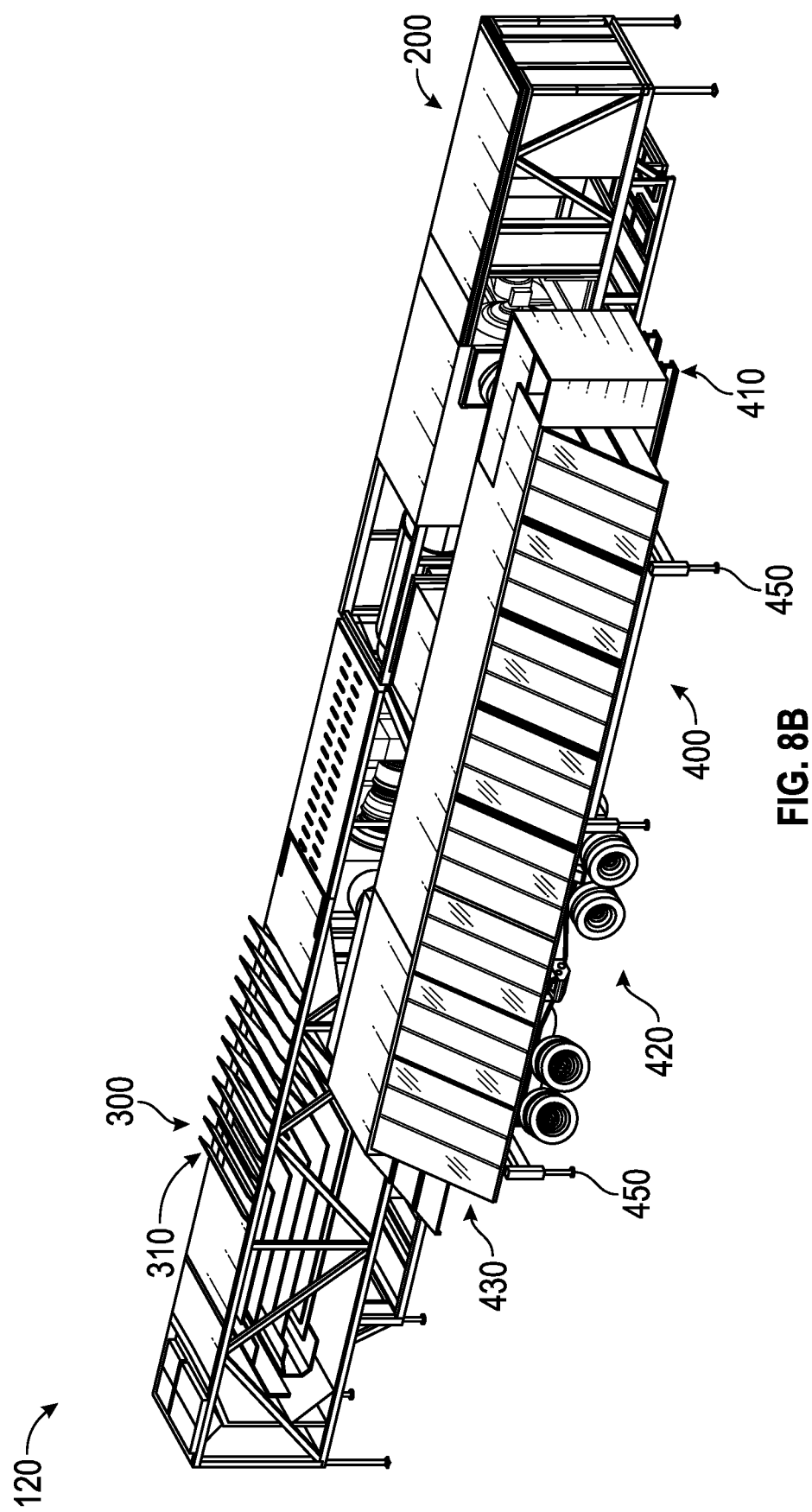
Figure 9:
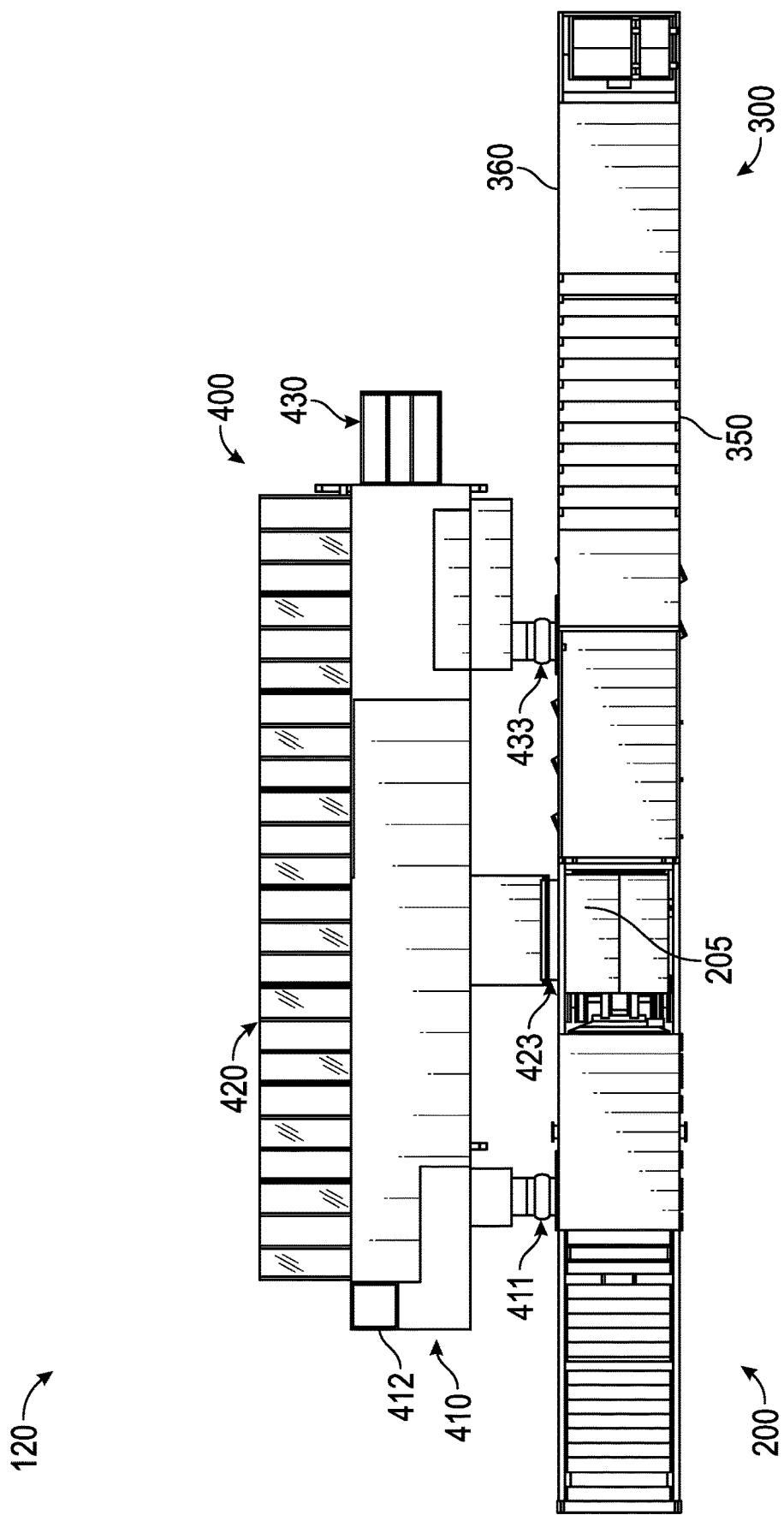
FIG. 9 is a schematic diagram showing a top-profile view of the gas turbine transport, the generator transport, and the air handling transport connected to each other in the operation mode, in accordance with one or more embodiments.

FIGS. 3A-3B also show intake ports 325 disposed on a side surface (a side that faces the air handling transport 400 during the operation mode; e.g., FIGS. 8A-8B, and 9) of gas turbine transport 300. Intake ports 325 are adapted to fluidly connect with and intake filtered ventilation and cooling air from air handling transport 400 for ventilating an interior of enclosure 360 of transport 300, and for cooling heat radiated from gas turbine 305 during the operation mode. The filtered ventilation and cooling air entering enclosure 360 from air handling transport 400 via intake ports 325 ventilates the interior of enclosure 360 and cools gas turbine 305 radiant heat, and exits out around end wall 365 inside enclosure 360 where the exhaust thrust air from outlet 306 of gas turbine 305 enters the interior of horizontal exhaust 310. The heated ventilation and cooling air of enclosure 360 of turbine transport 300 thus flows around and surrounds the exhaust thrust air exiting gas turbine 305 inside horizontal exhaust 310, runs through silencers or baffles 315 disposed inside horizontal exhaust 310, and exits the equipment through louver doors 350 disposed at the roof of enclosure 360, along with the hot turbine exhaust thrust air.

As shown in the embodiment of FIGS. 4A-4B, gas turbine transport 300' further includes movable exhaust stack 375 (e.g., turbine exhaust unit) that is mounted on base frame 302 of turbine transport 300'. The gas turbine exhaust stack 375 may comprise exhaust connector 378 (e.g., first portion), and gas turbine exhaust 376 and exhaust extension 377 configured for noise control (e.g., second portion). The exhaust extension 377 may comprise a plurality of silencers that reduce noise from the heated exhaust thrust air exiting the equipment. Exhaust connector 378 is mounted on base frame 302 of transport and houses therein exhaust collector 380 (e.g., exhaust diffuser, exhaust plenum) that may include an upward curved portion that is disposed inside exhaust connector 378 and that is configured to collect the exhaust thrust air from outlet 306 of gas turbine 305 and supply the exhaust air to turbine exhaust 376 of gas turbine exhaust stack 375 in the operation mode. The exhaust stack 375 thus defines an exhaust passage corresponding to exhaust collector 380, exhaust connector 378, turbine exhaust 376, and exhaust extension 377 in the operation mode.

As shown in FIGS. 4A-4B, exhaust stack 375 is movable between first and second positions such that in the first position exhaust stack 375 is lowered on the gas turbine transport 300', and in the second position the exhaust stack 375 is raised on the gas turbine transport 300' and pointing exhaust passage vertically (e.g. 90 degrees). That is, as shown in FIGS. 4A, the gas turbine exhaust stack 375 may be mounted to initially lie on its side (e.g., 180 degrees) during the transportation mode. In operation mode, as shown in FIG. 4B (and FIG. 7F), the gas turbine exhaust stack 375 may be rotated up without using external mechanical equipment such that the gas turbine exhaust stack 375 is mounted on the base frame 302 of the gas turbine transport 300' and in the upright position (e.g., 90 degrees), and is fluidly connected to and mated and sealed with exhaust connector 378. Gas turbine exhaust stack 375 may be positioned from the first (horizontal; transportation) position to the second (vertical, upright, operation) position, and/or from the second position to the first position using hydraulics (e.g., a hydraulic system), pneumatics, and/or electric motors such that in the second position, turbine exhaust 376 aligns and connects with exhaust connector 378 and exhaust collector 380 of gas turbine 305 shown in FIGS. 4A and 4B (and FIG. 7F). Exhaust connector 378 may thus be adapted to accommodate and align gas turbine exhaust stack 375 with exhaust collector 380 coupled to outlet 306 of gas turbine 305. In operation mode, exhaust stack 375, which may be connected to base frame 305 via a hinge (not shown) may rotatably move relative to base frame 305 to align and connect with exhaust connector 378.

Figure 5:
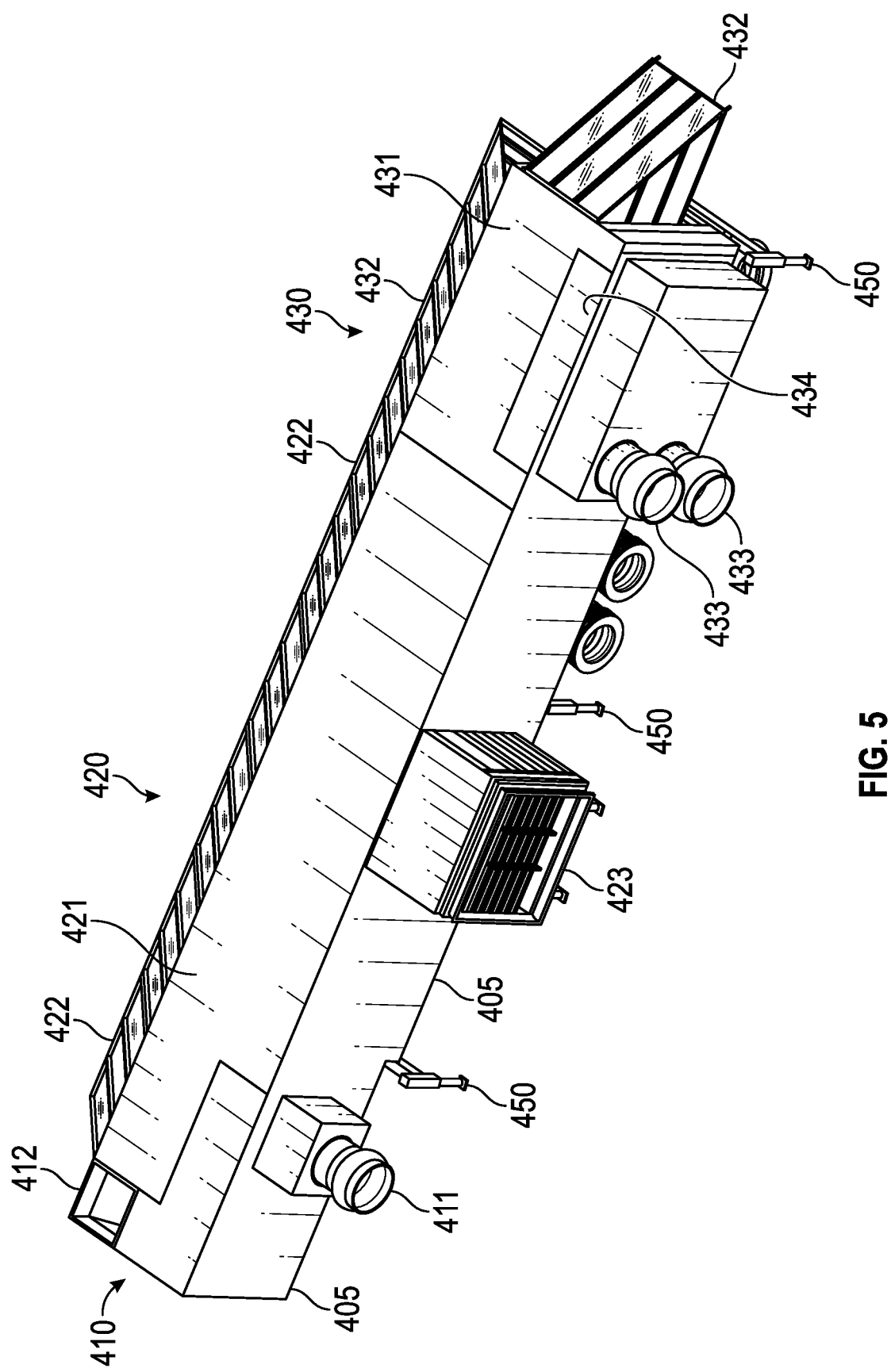
FIG. 5 is a schematic diagram showing a perspective view of an air handling transport, in accordance with one or more embodiments.
Figure 6:
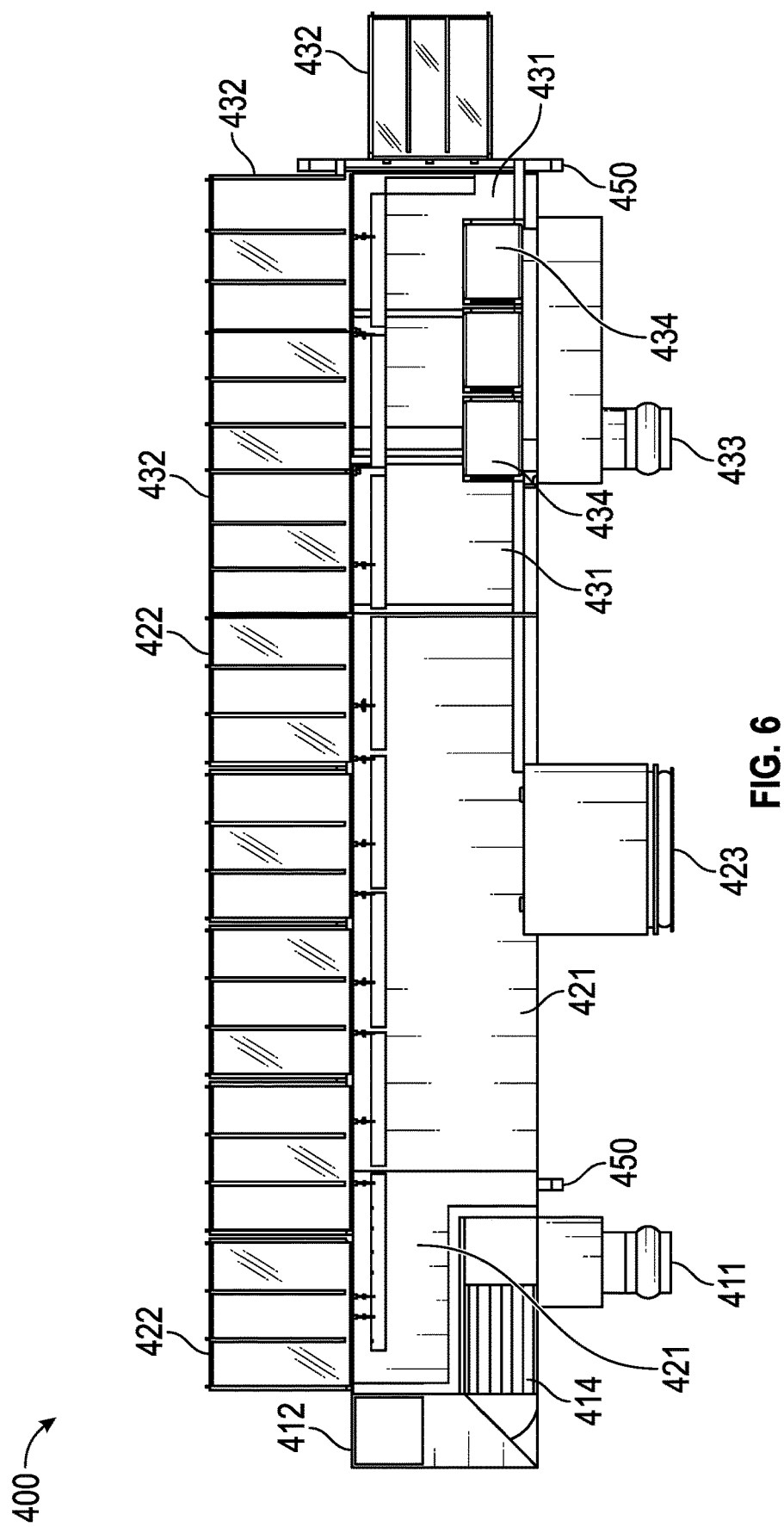
FIG. 6 is a schematic diagram showing a top-profile view of an air handling transport, in accordance with one or more embodiments.

FIGS. 5 and 6 are schematic diagrams respectively showing a perspective view and a top-profile view of air handling transport 400, in accordance with one or more embodiments. Air handling transport 400 includes enclosure 405 mounted on a base frame of air handling transport 400. Enclosure 405 may include a plurality of compartments (e.g., air boxes) respectively corresponding to a plurality of air systems that are disposed on air handling transport 400. The plurality of air systems may include generator exhaust air handling system 410, combustion air handling system 420, and turbine enclosure air handling system 430. Each of the plurality of air systems of air handling transport 400 respectively defines, in conjunction with one or more of the transports 200 and 300, 300', and while in the operation mode, a corresponding air flow path (e.g., air passage, air passageway). For example, in the operation mode, generator exhaust air handling system 410 may define a generator exhaust air flow path or passage in conjunction with generator transport 200, combustion air handling system 420 may define a combustion air flow path or passage in conjunction with both the generator transport 200 and gas turbine transport 300, 300' and turbine enclosure air handling system 430 may define a turbine ventilation and cooling air flow path or passage in conjunction with the gas turbine transport 300, 300'.

Generator exhaust air handling system 410 of transport 400 includes intake port 411 for intake of heated generator exhaust air from outlet port 235 of generator transport 200, and generator exhaust air handling system 410 further includes an outlet 412 on a roof of enclosure 405 of transport 400 such that the heated generator exhaust air exits the equipment through the outlet 412. As shown in FIG. 6, a plurality of silencers or baffles 414 may be disposed in the generator exhaust air flow path between intake port 411 and outlet 412 of generator exhaust air handling system 410. The plurality of silencers 414 are configured to reduce noise of the generator exhaust air as it exits the equipment through outlet 412.

Combustion air handling system 420 of transport 400 includes gas turbine air inlet filter housing 421 with one or more air inlets and one or more air filters that are mounted along one or more interior end or side surfaces of an air box defined within enclosure 405 of transport 400 to intake ambient air from the one or more air inlets for combustion by gas turbine 305. Combustion air may be air that is supplied to gas turbine 305 to aid in production of mechanical energy. Although not specifically shown in the figures, air inlet filter housing 421 may include a plurality of air inlets and filters that are mounted as one or more two-dimensional grids or arrays of filters. The arrangement of air inlet filter housing 421 on transport 400 or the number and arrangement of the gas turbine air inlets and filters of housing 421 is not intended to be limiting. Any number or arrangement of inlets and filters of filter housing 421 may be employed depending on, e.g., the amount or volume of clean air and the air flow dynamics needed to supply adequate amount of fresh combustion air to gas turbine 305 for the power generation operation.

As shown in FIGS. 5-6, air inlet filter housing 421 may be covered with air inlet filter housing doors (e.g., weather hoods, tent doors, louvers, and the like) 422 to cover the air inlets and filters from the elements when the air handling transport 400 is in the transportation mode. Doors 422 may be coupled to a top end (or a side end) of enclosure 405 (or the frame of transport 400) by a coupling member (e.g., hinge) and may be controlled by an actuating system so as to be pivotable between a closed position during the transportation mode and an open position during the operation mode. In some embodiments, doors 422 may be pivotable between the closed and open positions manually. In case transport 400 is equipped with an actuating system, any suitable mechanism may be employed to mechanically actuate one or more of the doors 422 between the open and closed positions. For example, the actuating system may be implemented using a hydraulic system, an electric motor, a rack-and-pinion system, a pneumatic system, a pulley-based system, and the like. As shown in FIGS. 5-6, in the open position during the operation mode, doors 422 may remain open to allow ambient air to easily enter air inlet filter housing 421. During the operation mode, doors 422 may also act as a roof that protects filters of air inlet filter housing 421 from environmental elements like sun, rain, snow, dust and the like. In the closed position during the transportation mode, doors 422 may be controlled by the actuating system to be closed to prevent damage to the air inlet filters during transportation, and provide increased aerodynamics and enhanced mobility of air handling transport 400 over a variety of roadways. As shown in FIGS. 5-6, air inlet filter housing 421 has an outlet port 423 that is adapted to be fluidly coupled to inlet plenum 205 of generator transport 200.

Turbine enclosure air handling system 430 of transport 400 includes turbine enclosure air inlet filter housing 431 with one or more air inlets and one or more air filters that are mounted along one or more interior end or side surfaces of an air box defined within enclosure 405 of transport 400 to intake ambient air from the one or more air inlets for supplying ventilation and cooling air to enclosure 360 of gas turbine transport 300, 300' for ventilating an interior to the enclosure 360 of transport 300, 300' and cooling heat radiated from gas turbine 305. Although not specifically shown in the figures, enclosure air inlet filter housing 431 may include a plurality of air inlets and filters that are mounted as one or more two-dimensional grids or arrays of filters. The arrangement of enclosure air inlet filter housing 431 on transport 400 or the number and arrangement of the enclosure air inlets and filters of housing 431 is not intended to be limiting. Any number or arrangement of inlets and filters of filter housing 431 may be employed depending on, e.g., the amount or volume of clean air and the air flow dynamics needed to supply adequate amount of fresh enclosure ventilation and cooling air to transport 300, 300'.

As shown in FIGS. 5-6, enclosure air inlet filter housing 431 may be covered with enclosure air inlet filter housing doors (e.g., weather hoods, tent doors, louvers, and the like) 432 to cover the air inlets and filters from the elements when the air handling transport 400 is in the transportation mode. Doors 432 may be coupled to a top end (or a side end) of enclosure 405 (or the frame of transport 400) by a coupling member (e.g., hinge) and may be controlled by an actuating system so as to be pivotable between a closed position during the transportation mode and an open position during the operation mode. In some embodiments, doors 432 may be pivotable between the closed and open positions manually. In case transport 400 is equipped with an actuating system, any suitable mechanism may be employed to mechanically actuate one or more of the doors 432 between the open and closed positions. For example, the actuating system may be implemented using a hydraulic system, an electric motor, a rack-and-pinion system, a pneumatic system, a pulley-based system, and the like. As shown in FIGS. 5-6, in the open position during the operation mode, doors 432 may remain open to allow ambient air to easily enter enclosure air inlet filter housing 431. During the operation mode, doors 432 may also act as a roof that protects of the enclosure air inlet filters from environmental elements like sun, rain, snow, dust and the like. In the closed position during the transportation mode, doors 432 may be controlled by the actuating system to be closed to prevent damage to the air inlet filter housing 431 during transportation, and provide increased aerodynamics and enhanced mobility of air handling transport 400 over a variety of roadways. As shown in FIGS. 5-6, enclosure air inlet filter housing 431 has outlet ports 433 that are adapted to be fluidly coupled to turbine enclosure air intake ports 325 of turbine transport 300, 300'. Enclosure air inlet filter housing 431 may also include one or more fans 434 that create the air flow from the air inlets of housing 431 to outlet ports 433 for supplying filtered enclosure ventilation and cooling air to gas turbine transport 300, 300'.

As shown in FIG. 5, to adjust the positioning, alignment, and distance in order to connect air handling transport 400 to generator transport 200 and gas turbine transport 300 during the operation mode, air handling transport 400 may include a hydraulic walking system. For example, the hydraulic walking system may move and align transport 400 into a position without attaching transport 400 to a transportation vehicle (e.g., a tractor or other type of motor vehicle) or without requiring a crane or forklift or other external mechanical equipment. Using FIG. 5 as an example, the hydraulic walking system may comprise a plurality of outriggers and/or support feet 450 used to move transport 400 along any of the six degrees of freedom (e.g., back and forth, sideways, laterally). For example, at one or more of the outriggers and/or support feet 450, the hydraulic walking system may comprise zero or more of: a first hydraulic cylinder (e.g., actuator) that lifts/lowers transport 400, a second hydraulic cylinder (e.g., actuator) that moves transport 400 forward/backward, and a third hydraulic cylinder (e.g., actuator) that moves transport left/right, each hydraulic cylinder being independently operable in the operation mode. The hydraulic walking system on transport 400 thus increases mobility by reducing the precision needed when parking transport 400 in parallel and next to transports 200 and 300 (FIG. 9).

To improve mobility over a variety of roadways, each of the generator transport 200 (FIG. 2), gas turbine transport 300, 300' (FIGS. 3A-4B), and air handling transport 400 (FIGS. 5-6) may have a maximum height of about 13 feet and 6 inches, a maximum width of about 8 feet and 6 inches, and a maximum length of about 66 feet. Further, each of the three transports 200, 300, 300', and 400 may comprise at least three axles used to support and distribute the weight on transport. Other embodiments of each of the three transports 200, 300, 300', and 400 may be transports that exceed three axles (e.g., six axles) depending on the total transport weight. The dimensions and the number of axles may be adjusted to allow for the transport over roadways that typically mandate certain height, length, and weight restrictions.

To improve mobility of air handling transport 400, as shown in FIGS. 5-6, generator exhaust air handling system 410, combustion air handling system 420, and turbine enclosure air handling system 430 are configured to be connected from at least one of the sides of enclosure 405, as opposed to connecting one or more of air handling system 410, combustion air handling system 420, and turbine enclosure air handling system 430 from the top of the enclosure 405. Intake port 411 of generator exhaust air handling system 410 of air handling transport 400 may connect with outlet port 235 of generator 220 of generator transport 200 using one or more (first) expansion connections that extend from one or both of intake port 411 and outlet port 235 of transports 400 and 200 located at sides of transports 400 and 200 that face each other during the operation mode (FIG. 9). Any form of connection may be used as the one or more (first) expansion connections that provides the coupling between intake port 411 of transport 400 and outlet port 235 of transport 200 without using a crane, forklift, and/or any other similar external mechanical equipment to connect the expansion connections in place. The one or more (first) expansion connections may comprise a duct and/or an expansion joint to connect intake port 411 of transport 400 and outlet port 235 of transport 200 in the operation mode. The one or more (first) expansion connections may be configured to move and connect (e.g., using hydraulics, electronics, pneumatics, and the like) intake port 411 of transport 400 and outlet port 235 of transport 200 without using external mechanical equipment. The two transports 400 and 200 may be parked at a predetermined orientation and distance (e.g., using the hydraulic walking system of transport 400) such that the one or more expansion connections are able to connect intake port 411 of transport 400 and outlet port 235 of transport 200. The one or more (first) expansion connections may be mounted such that the one or more (first) expansion connections are sandwiched between intake port 411 of transport 400 and outlet port 235 of transport 200 in the operation mode.

Along similar lines, outlet port 423 of air inlet filter housing 421 of combustion air handling system 420 on transport 400 may connect with inlet plenum 205 mounted on generator transport 200 using one or more (second) expansion connections that extend from one or both of outlet port 423 and inlet plenum 205 of transports 400 and 200 located at sides of transports 400 and 200 that face each other during the operation mode (FIG. 9). Any form of connection may be used as the one or more (second) expansion connections that provides the coupling between outlet port 423 of transport 400 and inlet plenum 205 of transport 200 without using a crane, forklift, and/or any other similar external mechanical equipment to connect the expansion connections in place. The one or more (second) expansion connections may comprise a duct and/or an expansion joint to connect outlet port 423 of transport 400 and inlet plenum 205 of transport 200 in the operation mode. The one or more (second) expansion connections may be configured to move and connect (e.g., using hydraulics, electronics, pneumatics, and the like) outlet port 423 of transport 400 and inlet plenum 205 of transport 200 without using external mechanical equipment. The two transports 400 and 200 may be parked at a predetermined orientation and distance (e.g., using the hydraulic walking system of transport 400) such that the one or more (second) expansion connections are able to connect outlet port 423 of transport 400 and inlet plenum 205 of transport 200. The one or more (second) expansion connections may be mounted such that the one or more (second) expansion connections are sandwiched between outlet port 423 of transport 400 and inlet plenum 205 of transport 200 in the operation mode.

Still further, outlet ports 433 of enclosure air inlet filter housing 431 of turbine enclosure air handling system 430 on transport 400 may connect with turbine enclosure air intake ports 325 of turbine transport 300 using (third) expansion connections that extend from one or both of outlet ports 433 and intake ports 325 of transports 400 and 300 located at sides of transports 400 and 300 that face each other during the operation mode. Any form of connection may be used as the (third) expansion connections that provides the coupling between outlet ports 433 of transport 400 and intake ports 325 of transport 300 without using a crane, forklift, and/or any other similar external mechanical equipment to connect the expansion connections in place. The (third) expansion connections may comprise ducts and/or expansion joints to connect outlet ports 433 of transport 400 and intake ports 325 of transport 300 in the operation mode. The (third) expansion connections may be configured to move and connect (e.g., using hydraulics, electronics, pneumatics, and the like) outlet ports 433 of transport 400 and intake ports 325 of transport 300 without using external mechanical equipment. The two transports 400 and 300 may be parked at a predetermined orientation and distance (e.g., using the hydraulic walking system of transport 400) such that the (third) expansion connections are able to connect outlet ports 433 of transport 400 and intake ports 325 of transport 300. The (third) expansion connections may be mounted such that the (third) expansion connections are sandwiched between outlet ports 433 of transport 400 and intake ports 325 of transport 300 in the operation mode.

Connecting Generator Transport and Gas Turbine Transport During Operation Mode

During the operation mode, generator transport 200 and gas turbine transport 300 may be connected to each other by backing up the gas turbine transport 300 into generator transport 200, mating and locking the two transports 300 and 200 with each other, and elevating and leveling the mated and locked transports 200 and 300 as one, single transport. Details of connecting, locking, elevating, and leveling generator transport 200 and gas turbine transport 300 to each other for the operation mode are provided below with reference to FIGS. 7A-7F.

FIGS. 7A-7D are schematic diagrams illustrating details of connecting gas turbine transport 300 to generator transport 200 during the operation mode in accordance with one or more embodiments. And FIGS. 7E-7F are schematic diagrams illustrating gas turbine transport 300 and generator transport 200 in a connected configuration in the operation mode in accordance with one or more embodiments. As shown throughout in the figures, generator transport 200 and gas turbine transport 300 are separate transports that are independently movable during the transportation mode. During the operation mode, the two transports 200 and 300 are connected to each other such that the two transports become one, and are elevated and leveled together as one transport.

As shown in FIGS. 7E-7F, in the operation mode, transports 200 and 300 (or 300') are connected to each other along a length of the two transports (e.g., an end side of transport 200 connected to an end side of transport 300 (300')). As shown in FIG. 7D, generator transport 200 includes channels (e.g., alignment rails, guide rails) 705 and fifth-wheel connection 710 mounted on base frame 202 at a back-end (rear-end) 271 of transport 200. And as shown in FIGS. 7A-7C, base frame 302 of transport 300 (300') is adapted to mate with fifth-wheel connection 710 and slide into channels 705 mounted to base frame 202 of generator transport 200, when turbine transport 300 is backed into generator transport 200, to thereby mate gas turbine inlet 304 of gas turbine transport 300 with inlet plenum 205 mounted on generator transport 200.

Figure 7A:
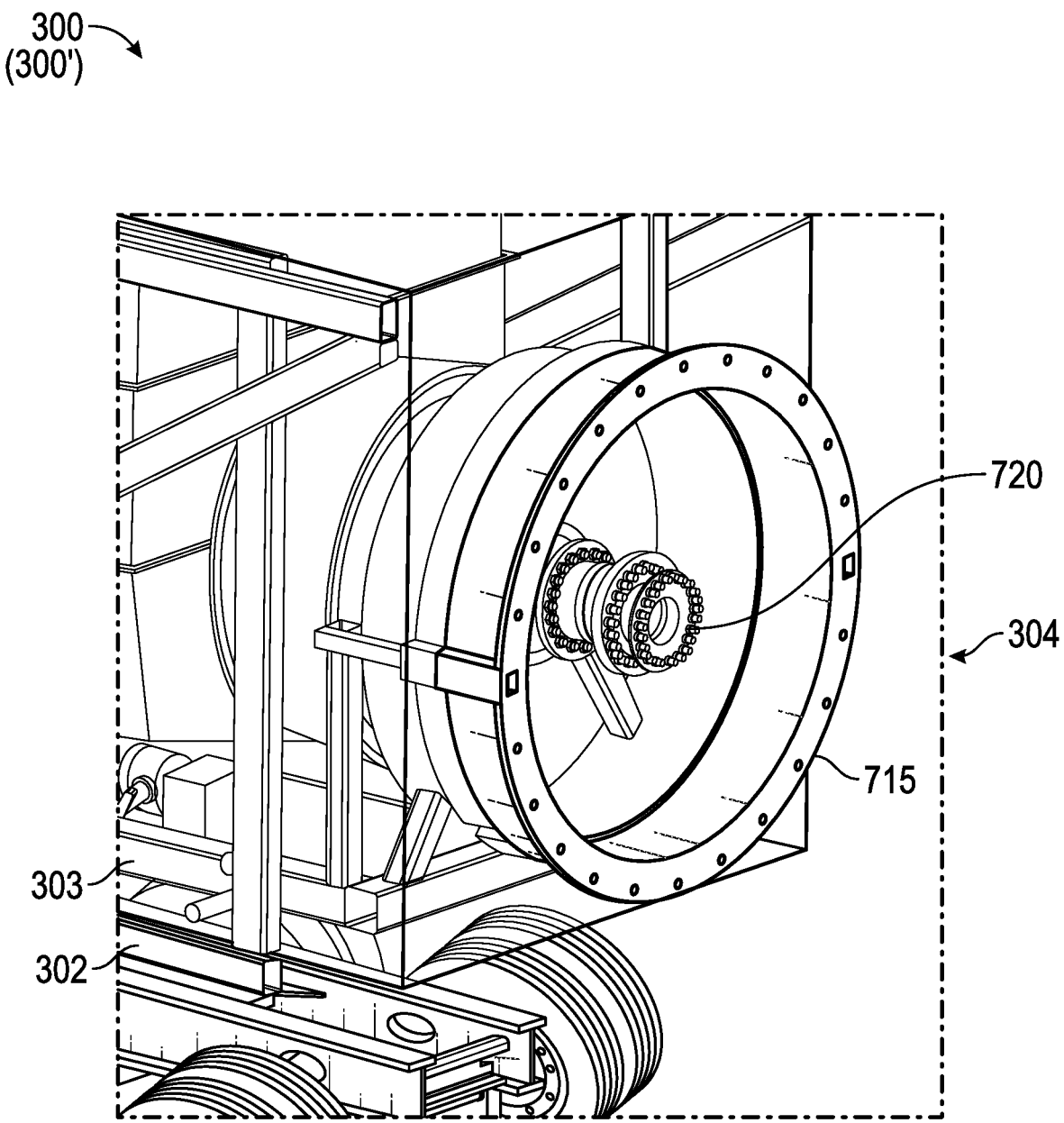
FIGS. 7A-7D are schematic diagrams illustrating details of connecting the gas turbine transport to the generator transport during the operation mode, in accordance with one or more embodiments.
Figure 7B:
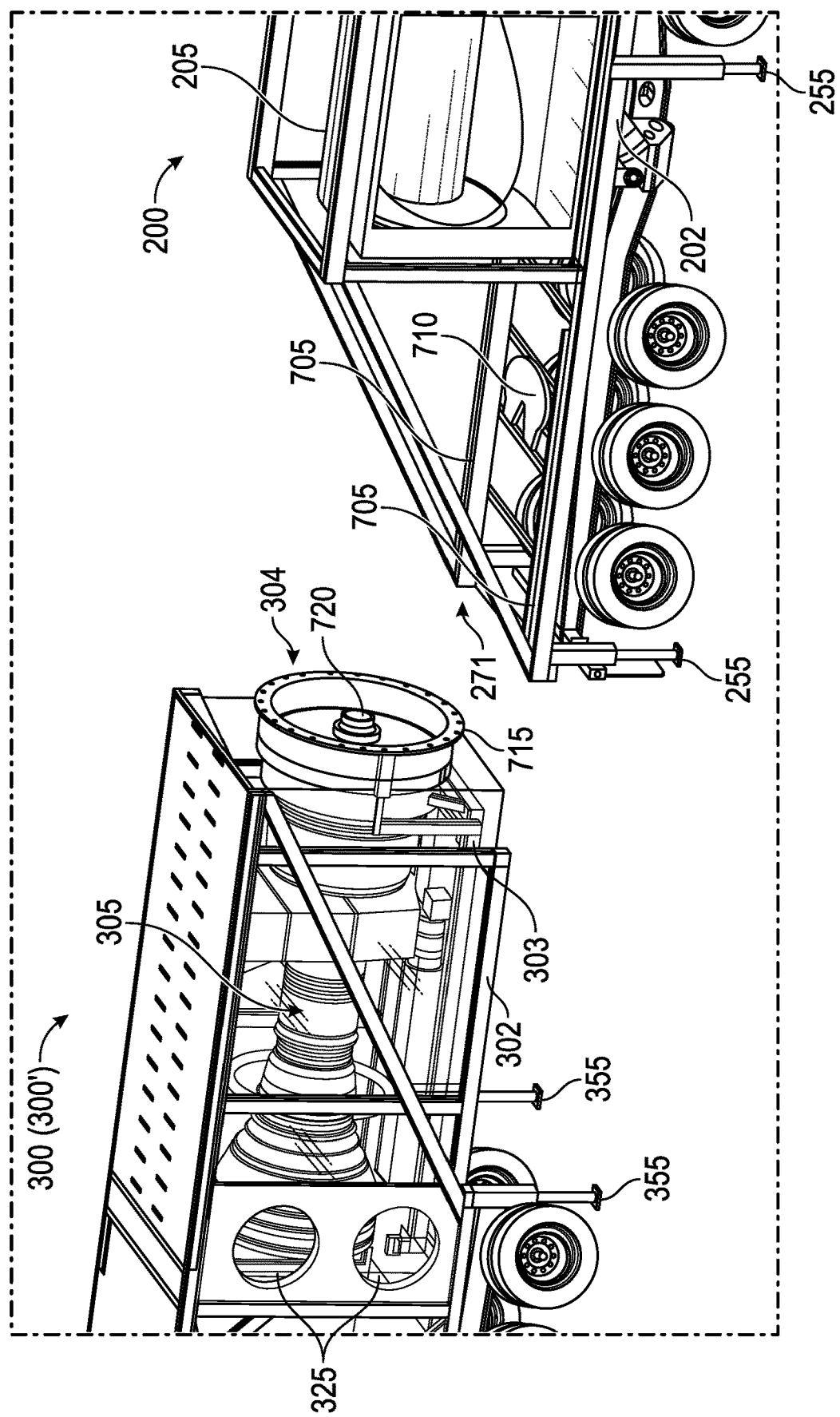
Figure 7C:
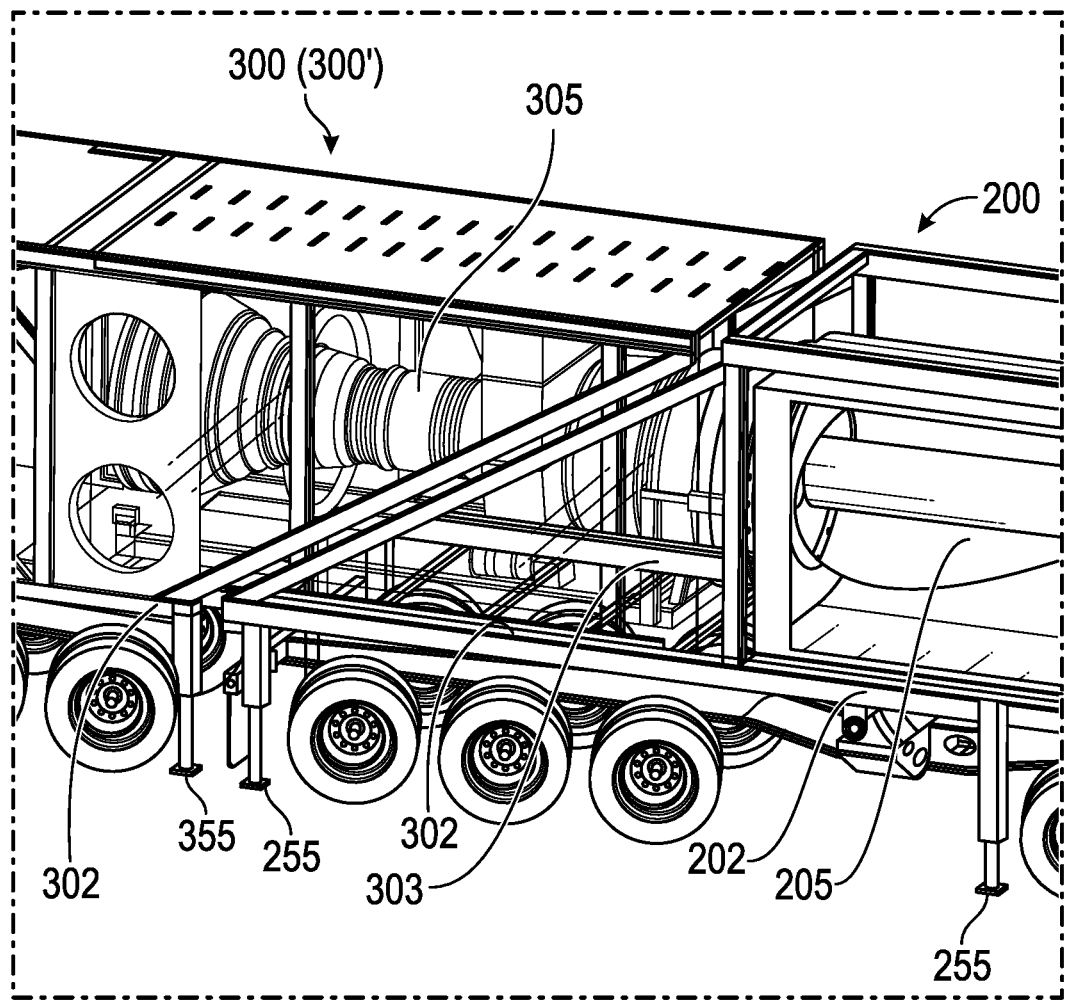
Figure 7D:
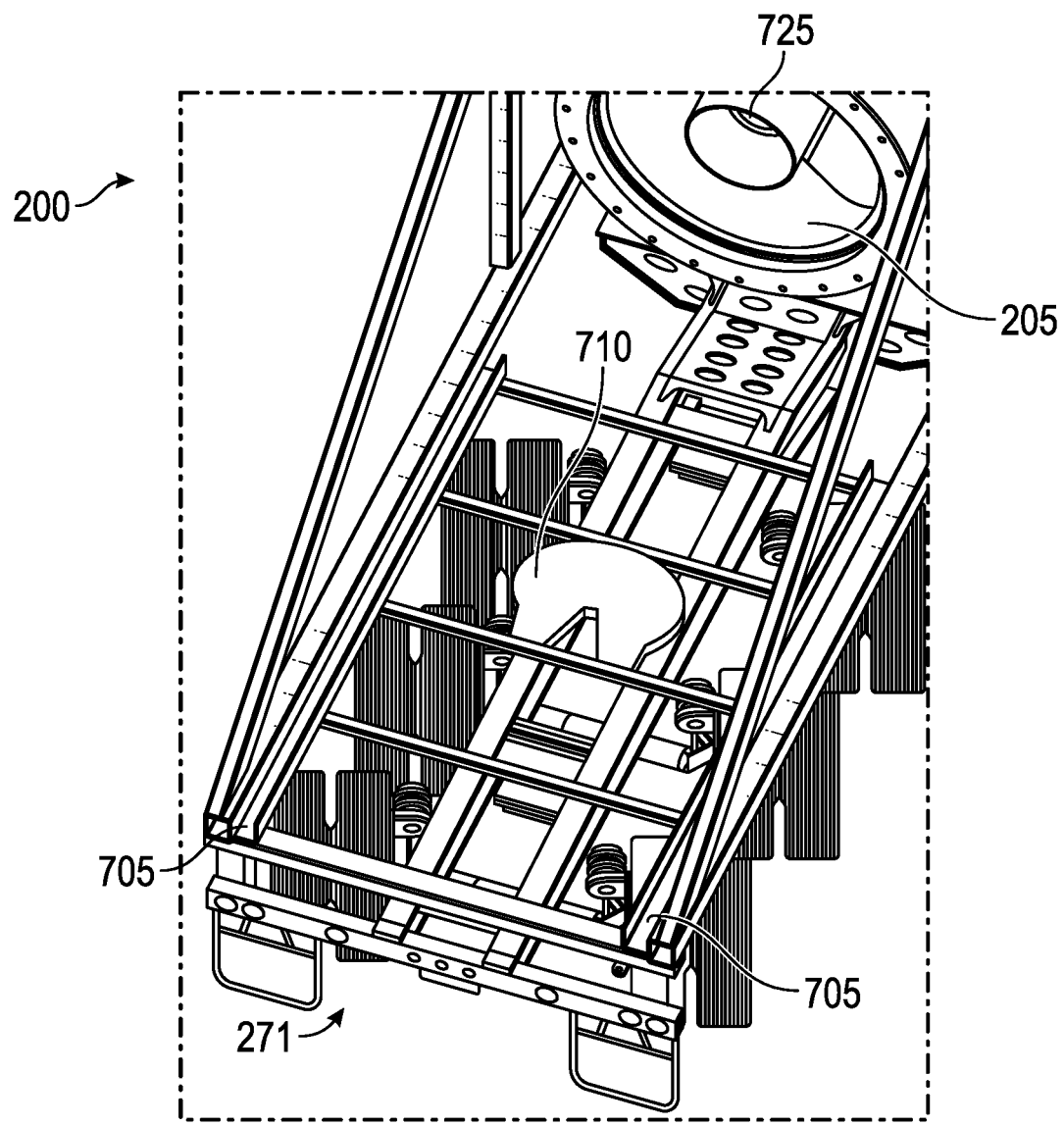
Figure 7E:
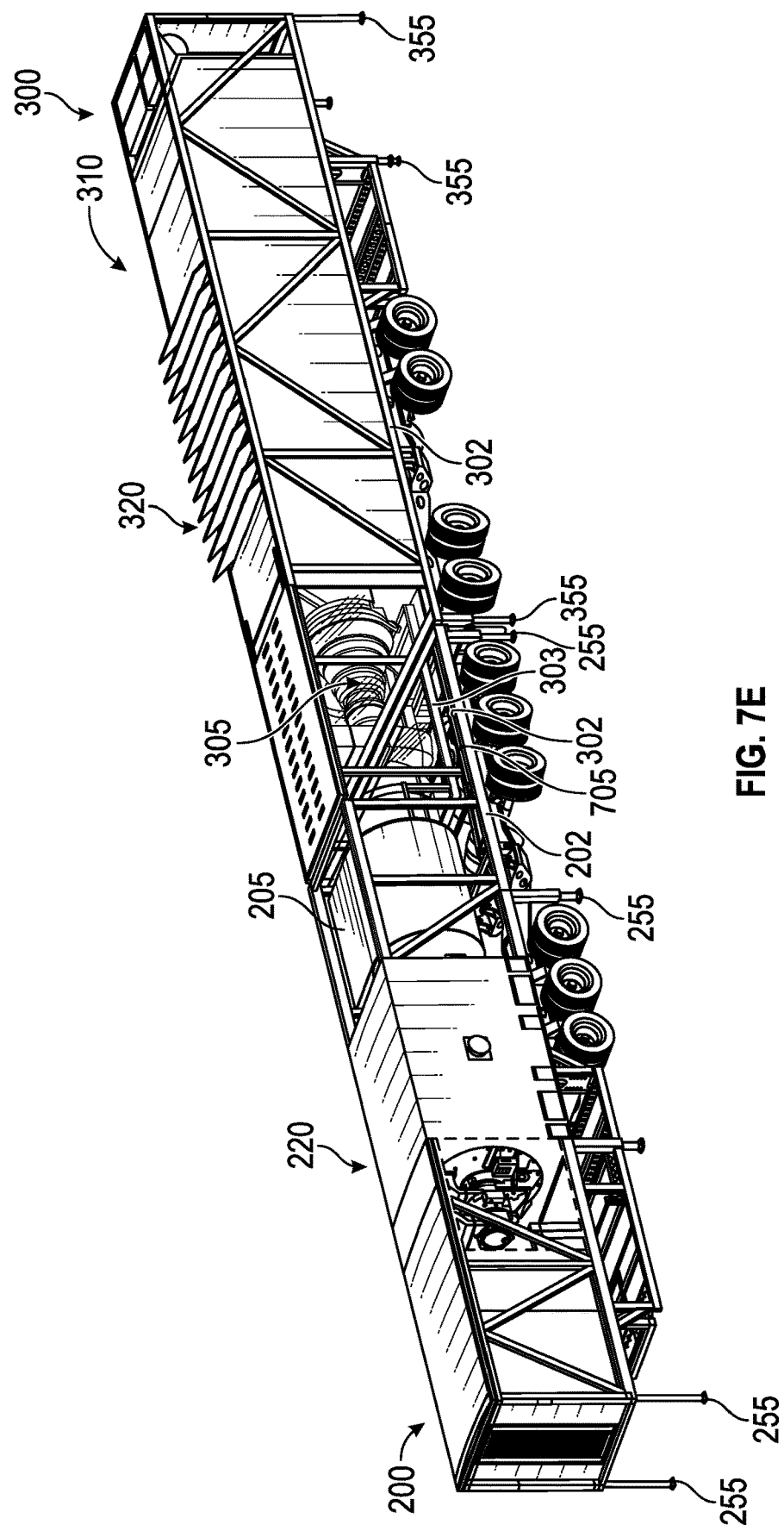
FIGS. 7E-7F are schematic diagrams illustrating the gas turbine transport and the generator transport in a connected configuration in the operation mode, in accordance with one or more embodiments.
Figure 7F:
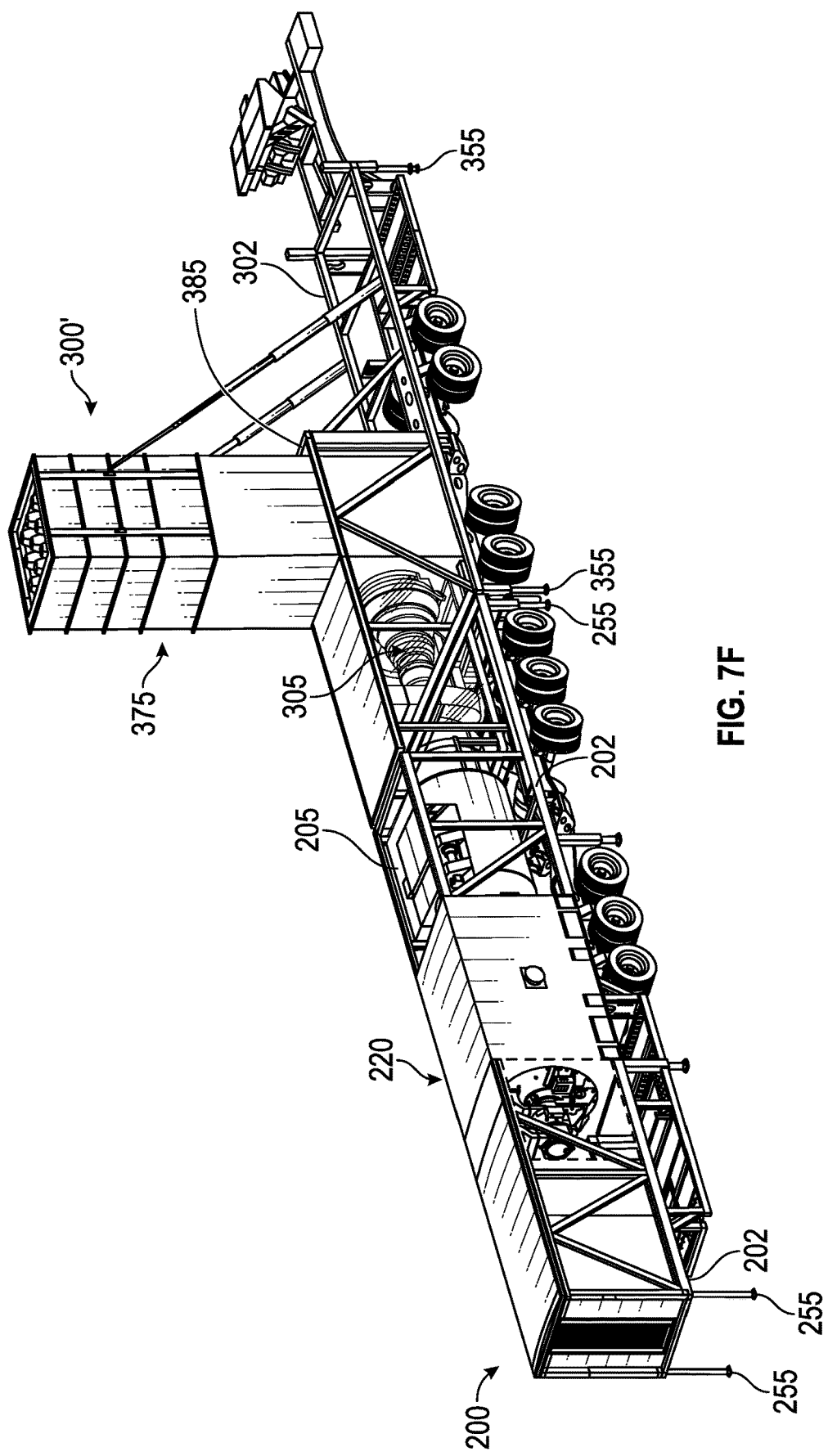

As shown in FIG. 7A, when converting transports 200 and 300 to the operation mode, extendable sleeve 715 may be coupled to gas turbine inlet 304 on gas turbine transport 300 to seal turbine airflow input to gas turbine 305 from inlet plenum 205 mounted on generator transport 200. Further, as shown in FIG. 7A, when converting transports 200 and 300 to the operation mode, coupling 720 (e.g., coupling member) may be attached at gas turbine inlet 304 to couple a generator shaft (not shown) of generator 220 to gas turbine 205. During the operation mode, and as shown in FIGS. 7E-7F, inlet plenum 205 is disposed between gas turbine 305 and generator 220, and as shown in FIG. 7D, the generator shaft in the operation mode may pass through hole 725 in inlet plenum 205 to transfer the mechanical energy from gas turbine 305 to generator 220.

Mobile source of electricity 120 may further include a connection control system to automatically perform the connection operation of connecting transports 200 and 300 to each other during the operation mode. In one embodiment, the connection control system may include control system 270 mounted on generator transport 200, a leveling system (e.g., hydraulic leveling system, electric leveling system, pneumatic leveling system) mounted on both transports 200 and 300, one or more sensors, and one or more actuators. The leveling system may include a plurality of outriggers and/or support feet 255 on generator transport 200, and a plurality of outriggers and/or support feet 355 on gas turbine transport 300, that are respectively configured to move transports 200 and 300 up and down to elevate and level the two transports as a single transport, after transports 200 and 300 are mated and locked into each other during the operation mode. That is, even though transports 200 and 300 are two separate and independent transports, the guide rails 705, fifth-wheel connection 710, and the automatic leveling system enables the two transports to be combined or mated and locked together onsite as one transport, and elevate and level the two combined and locked transports together as a single transport, before connecting the combined single transport (200, 300 (300')) to the air handling transport 400. The one or more actuators may include electric actuators (e.g., electric motor), hydraulic actuators, pneumatic actuators, and the like disposed at one or more locations throughout generator sensor 200 and gas turbine transport 300. For example, at each outrigger and/or support feet 255, 355, the leveling system may comprise a hydraulic cylinder (or other actuator like electric motor and screw, pneumatic actuator) that lifts or lowers the corresponding foot 255, 355 of the corresponding transport 200, 300.

The one or more sensors may include inclinometers, laser level sensors, alignment sensors, and the like, that are disposed at one or more locations throughout generator transport 200, and gas turbine sensor 300. For example, an inclinometer may be installed in connection with each outrigger and/or support feet 255, 355. During the connection operation, after gas turbine transport 300 is backed into generator transport 200 (FIGS. 7B-7D) along the alignment rails 705 mounted on generator transport 300, guided into position by fifth-wheel connection 710, and after extendable sleeve 715 and coupling 720 are installed to seal turbine inlet airflow and connect the generator shaft between gas turbine 305 and generator 220, the two transports 200, 300 (300') may be locked together, and then, control system 270 may perform an automatic levelling operation by operating the leveling system to activate the inclinometers on both transports 200 and 300, to control support feet 255, 355 on both transports to lift and level the two connected transports 200 and 300 as one, single transport (as shown in FIGS. 7E and 7F).

After the automatic leveling operation of transports 200 and 300, the connection control system may further control to perform an automatic precise alignment operation (e.g., alignment down to 1/1000th of an inch) between gas turbine 305 of turbine transport 300 and generator 220 of generator transport 200. Such a precise alignment operation is necessary for proper transfer of the mechanical (rotational) energy generated by the gas turbine 305 to the generator 220 (via the generator shaft) in order to generate electric power with high efficiency. The precise alignment operation may be performed every time after transports 300 and 200 are converted from the transportation mode into the operation mode by mating and locking the two transports into each other (FIGS. 7B and 7C), before beginning the power generation operation of mobile source of electricity 120. The connection control system may include screw aligners that pivotally couple sub-base 303 on which gas turbine 305 is mounted to the base frame 302 of turbine transport 300, and electric motors (or hydraulic cylinders or other electric, hydraulic, or pneumatic actuators) operable to electronically control and pivot the screw aligners. During the precise alignment operation, the control system 270 may utilize one or more sensors (e.g., laser level sensors) disposed at one or more locations of turbine transport 300 and at one or more locations of generator transport 200, to obtain sensor data and automatically control the electric motors (or other actuators) and screw aligners (e.g., pivoting mechanism) based on the obtained sensor data to precisely align gas turbine 305 on transport 300 to a drive line of generator 220 on transport 200. The screw aligners may thus pivot turbine 305 mounted on turbine sub-base 303 to make the alignment to generator 220. Thus, contrary to conventional systems where an entire turbine trailer needs to be moved in different directions to align a turbine with a generator disposed on a separate transport, the connection control system according to the present disclosure is capable of performing the precise alignment operation where only the sub-base (sub-skid) 303 corresponding to gas turbine 305 needs to be moved to precisely align (e.g., alignment down to $\frac{1}{1000}$th of an inch) gas turbine 305 to the drive line of generator 220.

FIGS. 8A-8B are schematic diagrams showing perspective views of gas turbine transport 300, generator transport 200, and air handling transport 400 connected to each other in the operation mode, in accordance with one or more embodiments. And FIG. 9 is a schematic diagram showing a top-profile view of gas turbine transport 300, generator transport 200, and air handling transport 400 connected to each other in the operation mode, in accordance with one or more embodiments. As explained previously, in the operation mode, generator exhaust air handling system 410 of air handling transport 400 defines generator exhaust air flow path in conjunction with generator transport 200, combustion air handling system 420 of air handling transport 400 defines a combustion air flow path in conjunction with both generator transport 200 and gas turbine transport 300 (300'), and turbine enclosure air handling system 430 of air handling transport 400 defines a turbine ventilation and cooling air flow path in conjunction with gas turbine transport 300 (300').

The generator exhaust air flow path corresponds to an air flow path that begins on generator transport 200 and ends on air handling transport 400. As shown best in FIGS. 2 and 9, generator exhaust air flow path begins at louver doors 275 provided at one or more side surfaces of the enclosure of generator transport 200 when operation of fans 231 installed on intake 230 of generator 220 disposed inside the enclosure of generator transport 200 cause air to flow via louver doors 275 into the enclosure of generator transport 200 for ventilation and cooling of equipment inside the enclosure of generator transport 200. The generator exhaust air flow path then passes through a length of the interior of the enclosure of generator transport 200 where the air ventilates the interior of the enclosure of transport 200 and cools electronic equipment (e.g., equipment 225) disposed inside the enclosure of generator transport 200. The generator exhaust air flow path then passes through fans 231 disposed at intake 230 and enters generator 220 where the air ventilates an interior of generator 220 and cools heat radiated from the interior of generator 220. The ventilation and cooling air flowing along the generator exhaust air flow path then exits generator transport via outlet port 235 that is disposed on a side surface of generator 220. As shown in FIGS. 8A, 8B, and 9, in the operation mode, outlet port 235 of generator transport 200 is fluidly connected to intake port 411 of generator exhaust air handling system 410 of air handling transport 400. Thus, the generator exhaust air flow path extends from outlet port 235 and continues to intake port 411 on transport 400. The generator exhaust air flow path then continues on air handling transport 400 from intake port 411, and passes through the plurality of silencers or baffles 414 (FIG. 6) disposed downstream from intake port 411 on transport 400. The generator exhaust air flow path then continues on air handling transport 400 to cause the generator exhaust air to flow upward and exit the equipment from outlet 412 disposed on the roof of enclosure 405 of air handling transport 400 (FIGS. 5-6). Although not shown, a louver door may cover outlet 412 in the transportation mode, and the louver door may be opened during the operation mode.

The combustion air flow path corresponds to an air flow path that begins on air handling transport 400, continues to and passes through a portion of generator transport 200, and then continues to and ends on gas turbine transport 300 (or 300'). As shown best in FIG. 6, the combustion air flow path begins when ambient air enters the one or more air inlets of gas turbine air inlet filter housing 421 on air handling transport 400. The ambient air passes through the one or more air filters mounted at the one or more air inlets of the air box corresponding to air inlet filter housing 421 and the combustion air flow path proceeds to outlet port 423. As shown in FIGS. 8A-9, in the operation mode, outlet port 423 is fluidly connected to inlet plenum 205 of generator transport 200. Thus, the filtered combustion air in the combustion air flow path enters inlet plenum 205 disposed on generator transport 200 from outlet port 423. The combustion air flow path then continues in generator transport 200 where it passes through inlet plenum 205 and is then routed toward intake 304 of gas turbine 305 disposed on gas turbine transport 300 via extendable sleeve 715 disposed between intake 304 of gas turbine 305 on turbine transport 300, 300' and inlet plenum 205 on generator transport 200. The filtered combustion air flowing along the combustion air flow path then enters and passes through the gas turbine 305 for combustion and power generation, and heated exhaust thrust air is output from outlet 306 of gas turbine 305 on gas turbine transport 300, 300'.

In case the gas turbine transport is transport 300 shown in FIGS. 3A-3B with the horizontal exhaust 310, the combustion air flow path continues from outlet 306 of turbine 305 into an interior cavity of horizontal exhaust 310. The hot exhaust thrust air in the combustion air flow path entering horizontal exhaust 310 at the turbine-end thereof flows toward a plurality of silencers 315 disposed in an interior of horizontal exhaust 310 to reduce noise of the exhaust thrust air. After passing through the silencers 315, the silenced heated exhaust thrust air flows along the combustion air flow path to exit the equipment through louver doors 350 (FIG. 3B; FIG. 9) disposed at the roof of the enclosure 360 of gas turbine transport 300.

In case the gas turbine transport is transport 300' shown in FIGS. 4A-4B with the movable exhaust stack 375, the combustion air flow path continues from outlet 306 of turbine 305 into exhaust collector 380 where the heated exhaust thrust air travels upward along the exhaust passage corresponding to exhaust collector 380, exhaust connector 378, turbine exhaust 376, and exhaust extension 377. The heated exhaust thrust air also passes through the plurality of silencers disposed in exhaust extension 377 along the combustion air flow path. In the operation mode, the exhaust stack is positioned vertically as shown in FIGS. 4B and 7F in the operation mode.

The turbine ventilation and cooling air flow path corresponds to an air flow path that begins on air handling transport 400, and continues to and ends on gas turbine transport 300 (or 300'). As shown best in FIG. 6, the turbine ventilation and cooling air flow path begins when one or more fans 434 are operated to create air flow from the one or more air inlets of turbine enclosure air inlet filter housing 431 on air handling transport 400 to outlet ports 433 for supplying filtered enclosure ventilation and cooling air to gas turbine transport 300, 300'. The turbine ventilation and cooling air flow path begins when ambient air enters the one or more air inlets of turbine enclosure air inlet filter housing 431 on air handling transport 400. The ambient air passes through the one or more air filters mounted at the one or more air inlets of the air box corresponding to turbine enclosure air inlet filter housing 431 and the turbine ventilation and cooling air flow path proceeds to outlet ports 433 after passing through the one or more fans 434.

As shown in FIGS. 8A-9, in the operation mode, outlet ports 433 are fluidly connected to turbine enclosure air intake ports 325 of enclosure 360 of turbine transport 300 (or 300'). Thus, the filtered turbine enclosure ventilation and cooling air flowing along the turbine ventilation and cooling air flow path enters enclosure 360 of turbine transport 300 (or 300') from outlet ports 433 for ventilating an interior of enclosure 360 of turbine transport 300 (300') and for cooling radiant heat of gas turbine 305 disposed inside enclosure 360 of turbine transport 300 (300'). The turbine ventilation and cooling air flow path continues from intake ports 325 on turbine transport 300, 300' and extends along a length of enclosure 360 and along an outer peripheral surface of gas turbine 305.

In case the gas turbine transport is transport 300 shown in FIGS. 3A-3B with the horizontal exhaust 310, the turbine ventilation and cooling air flow path continues at a peripheral space between enclosure 360 and end wall 365 where exhaust thrust air from outlet 306 of gas turbine 305 in the combustion air flow path enters the interior of horizontal exhaust 310. The heated ventilation and cooling air flowing along the turbine ventilation and cooling air flow path flows around the exhaust thrust air of the gas turbine 305 in horizontal exhaust 310, runs through silencers or baffles 315 disposed inside horizontal exhaust 310, and exits the equipment through the louver doors 350 disposed at the roof of enclosure 360 along with the hot turbine exhaust thrust air. Thus, the turbine ventilation and cooling air flow path extends ractangularly annularly through end wall 365 and around the combustion air flow path that enters the interior of horizontal exhaust 310 from outlet 306 of gas turbine 305. The turbine ventilation and cooling air flowing along the turbine ventilation and cooling air flow path inside horizontal exhaust 310 thus comes out on each side of the combustion air as both flow paths merge and exit through louver doors 350 disposed at the roof of enclosure 360. In other words, the ventilation and cooling air flowing along the rectangular annular turbine ventilation and cooling air flow path creates an air insulation on all sides and all around (e.g., a periphery of) the hot exhaust thrust air flowing along the combustion air flow path inside horizontal exhaust 310. The air insulation created by the ventilation and cooling air flowing in the annular space may keep the external surface of horizontal exhaust 310 or enclosure 360 of gas turbine transport 300 from being overheated.

In case the gas turbine transport is transport 300' shown in FIGS. 4A-4B with the movable exhaust stack 375, the turbine ventilation and cooling air flow path continues at a peripheral space between enclosure 360 and end wall 365 where exhaust thrust air from outlet 306 of gas turbine 305 in the combustion air flow path enters exhaust collector 380 and travels upward along the exhaust passage. The turbine ventilation and cooling air flow path thus continues along the rectangular annulus space defined by an interior surface of enclosure 360 and an exterior surface of the exhaust passage, and more specifically an exterior surface of exhaust connector 378, and turbine exhaust 376. The heated ventilation and cooling air flowing along the turbine ventilation and cooling air flow path flows through the rectangular annulus space may exit the equipment through outlet 385 (FIG. 4B) at the roof of the enclosure of turbine transport 300' while the exhaust stack 375 is in the vertical position in the operation mode. Thus, the turbine ventilation and cooling air flow path extends rectangularly annularly and around the combustion air flow path corresponding to the vertical exhaust passage. In other words, the ventilation and cooling air flowing along the annular turbine ventilation and cooling air flow path creates an air insulation on all sides and all around (e.g., a periphery of) the hot exhaust thrust air flowing along the combustion air flow path. The air insulation created by the ventilation and cooling air flowing in the rectangular annular space may keep the external surface of one or more of the exhaust passage, exhaust stack 375, exhaust collector 380, exhaust connector 378, turbine exhaust 376, and/or exhaust extension 377, from being overheated.

Figure 10:
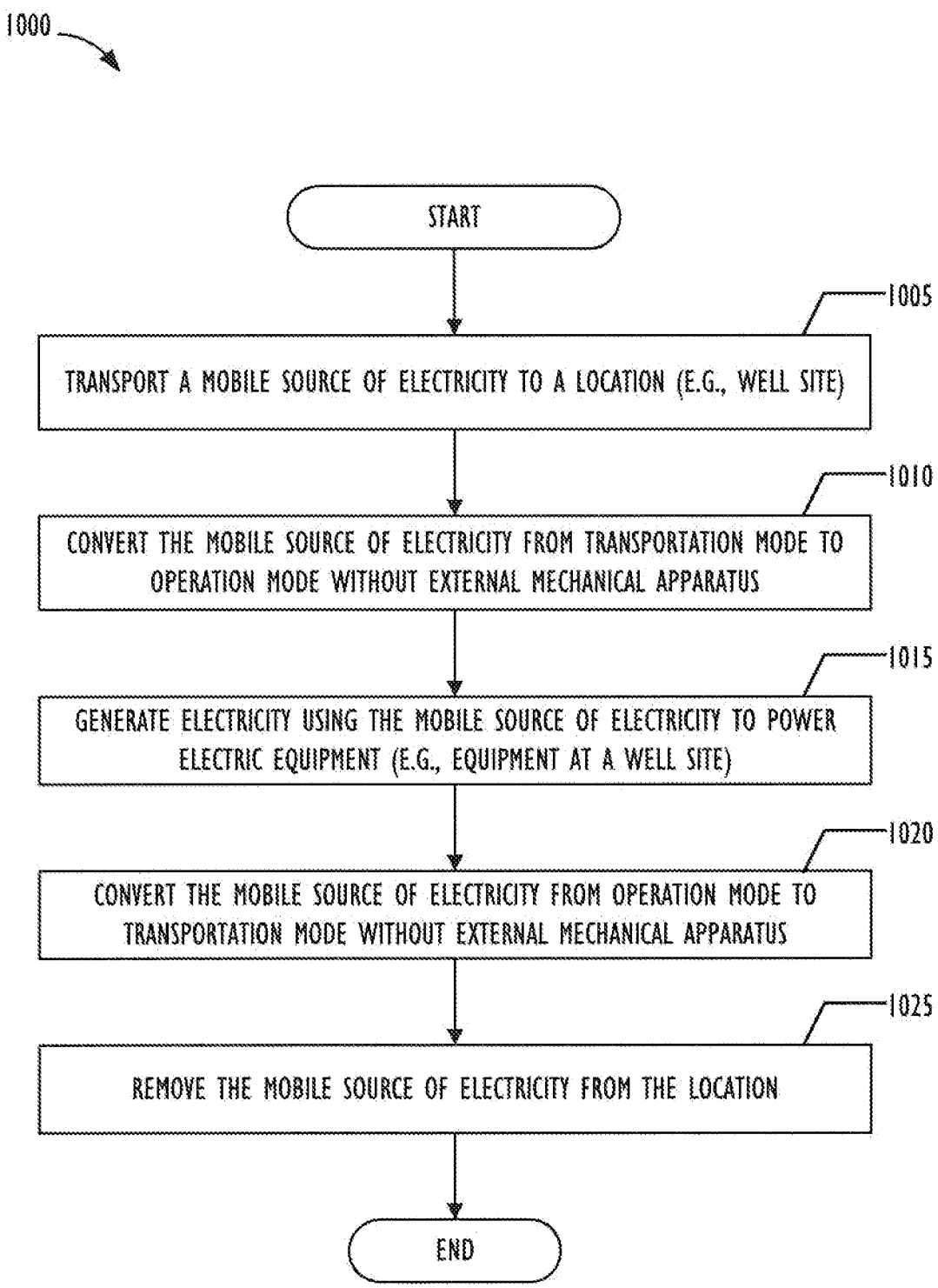
FIG. 10 is a flow chart of an embodiment of a method to provide a mobile source of electricity for various applications.

FIG. 10 is a flow chart of an embodiment of method 1000 to provide a mobile source of electricity for any operation requiring a mobile power source. Method 1000 may begin at block 1005 by transporting a mobile source of electricity (e.g., mobile source of electricity 120 of FIG. 1 that includes generator transport 200, gas turbine transport 300, and air handling transport 400, each of the transports 200, 300 (or 300'), and 400 being separately and independently movable in the transportation mode) to a remote location. Method 1000 may then move to block 1010 and convert the mobile source of electricity from transportation mode to operation mode. The same transports 200, 300 (or 300') and 400 may be used during the conversion from transportation mode to operation mode. In other words, transports are not added and/or removed when setting up the mobile source of electricity for operation mode. Additionally, method 1000 at block 1010 may be performed without the use of a forklift, crane, and/or other similar external mechanical equipment to transition the mobile source of electricity into operation mode.

For example, at block 1010, the steps that may be performed to convert the mobile source of electricity into the operation mode from the transportation mode may include one or more of the following steps: park transports 200 and 300 (300') next to each other along a length direction (as shown in, e.g., FIGS. 7B, 7C, 7E, 7F); back-up gas turbine transport 300 into generator transport 200 along guide rails 705 (FIGS. 7B, 7C, 7D) and fifth-wheel alignment 710 such that intake 306 of gas turbine 305 is mated with inlet plenum 205 of generator transport 200; connect extendable sleeve 715, and coupling 720 (FIG. 7A), and connect a generator shaft between turbine 305 on transport 300 and generator 220 on transport 200 such that the generator shaft passes through hole 725 in inlet plenum 205 on transport 200; lock connected transports 200 and 300; perform an automatic leveling operation by operating the leveling system mounted on transports 200 and 300 to lift and level the two connected and locked transports 200 and 300 as a single transport (as shown in FIGS. 7E and 7F), thereby levelling the two transports 200 and 300 as one, single transport; perform a precise alignment operation between gas turbine 305 of turbine transport 300 and generator 220 of generator transport 200 using screw aligners, electric motors, and laser level sensors to move sub-base (sub-skid) 303 corresponding to gas turbine 305 and precisely align (e.g., alignment down to $1/1000$th of an inch) gas turbine 305 to the drive line of generator 220; open louver doors 275 (FIG. 2) provided on one or more side surfaces of the enclosure of generator transport 200 to intake ambient air for generator ventilation and cooling air; open louver doors 350 disposed at the roof of the enclosure 360 of gas turbine transport 300 in case the gas turbine transport is transport 300 shown in FIGS. 3A-3B with the horizontal exhaust 310; raise exhaust stack 375 on the gas turbine transport 300' to point the exhaust passage vertically (FIGS. 4B, 7F) so as to be in the operation mode, in case the gas turbine transport is transport 300' shown in FIGS. 4A-4B with the movable exhaust stack 375; as shown in FIGS. 8A, 8B, and 9, park air handling transport 400 at a predetermined distance relative to and parallel to the transports 200 and 300 that are coupled to each other (FIGS. 7E, 7F) such that a side of air handling transport 400 where ports 411, 423, and 433 are disposed faces a side of the connected and locked transports 200 and 300 where port 235, inlet plenum 205, and ports 325 are disposed (FIGS. 8A, 8B, 9) and such that transport 400 is positioned substantially parallel to the combined transports 200 and 300 (e.g., longitudinal side of transport 400 faces longitudinal sides of combined transports 200 and 300); open air inlet filter housing doors 422 and 432 of air handling transport 400 (FIGS. 5, 6, 9); open the louver door that covers outlet 412 disposed on the roof of enclosure 405 of air handling transport 400; operate the hydraulic walking system 450 may move and align transport 400 into a predetermined position relative to generator and gas turbine transports 200 and 300 (or 300'); utilize the one or more (first) expansion connections to move and fluidly connect and seal intake port 411 of generator exhaust air handling system 410 of air handling transport 400 to outlet port 235 of generator 220 of generator transport 200; utilize the one or more (second) expansion connections to move and fluidly connect and seal outlet port 423 of air inlet filter housing 421 of combustion air handling system 420 on transport 400 to inlet plenum 205 mounted on generator transport 200; and utilize the (third) expansion connections to move and fluidly connect and seal outlet ports 433 of enclosure air inlet filter housing 431 of turbine enclosure air handling system 430 on transport 400 to turbine enclosure air intake ports 325 of turbine transport 300 (or 300'); and supply hydrocarbon fuel to gas turbine 305 for the power generation operation.

Method 1000 may then move to block 1015 and generate electricity using the mobile source of electricity to power a variety of operations requiring a mobile power source. In one embodiment, method 1000 may generate electricity by converting hydrocarbon fuel into electricity using the gas turbine and the generator respectively disposed on the gas turbine transport and on the generator transport. During the power generation operation, as explained previously, ventilation and cooling air may flow along the generator exhaust air flow path that extends from the roof of generator transport 200, and passes into and ends at the roof of air handling transport 400 (i.e., air flowing into transport 400), filtered combustion air may flow along the combustion air flow path that begins on air handling transport 400, passes through generator transport 200, and ends at gas turbine transport 300 (or 300') (i.e., air flowing out of transport 400), and turbine ventilation and cooling air may flow along the turbine ventilation and cooling air flow path that begins on air handling transport 400, and passes into and ends on gas turbine transport 300 (or 300') (i.e., air flowing out of transport 400). Method 1000 may then move to block 1020 and convert the mobile source of electricity from operation mode to transportation mode without utilizing any external mechanical equipment. Similar to block 1010, the conversion process for block 1020 may use the same transport without using a forklift, crane, and/or other similar external mechanical equipment to transition the mobile source of electricity back to transportation mode.

For example, at block 1020, the steps that may be performed to convert the mobile source of electricity into the transportation mode from the operation mode may include one or more of the following steps: stop supplying hydrocarbon fuel to gas turbine 305; disconnect the one or more first, second, and third expansion connections (FIGS. 8A, 8B, 9) that connect transport 400 to the combined and locked transports 200 and 300; close air inlet filter housing doors 422 and 432 of air handling transport 400; close the louver door that covers outlet 412; operate the hydraulic walking system 450 to move transport 400 away from the generator and gas turbine transports 200 and 300 (or 300'); lower exhaust stack 375 on the gas turbine transport 300' to point the exhaust passage horizontally (FIG. 4A) so as to be in the transportation mode, in case the gas turbine transport is transport 300' shown in FIGS. 4A-4B with the movable exhaust stack 375; close louver doors 350 disposed at the roof of the enclosure 360 of gas turbine transport 300, in case the gas turbine transport is transport 300 shown in FIGS. 3A-3B with the horizontal exhaust 310; close louver doors 275 (FIG. 2) provided on one or more side surfaces of the enclosure of generator transport 200; disconnect extendable sleeve 715, and coupling 720 (FIG. 7A), and disconnect the generator shaft between turbine 305 on transport 300 and generator 220 on transport 200; unlock and separate transports 200 and 300 (300') from each other by driving gas turbine transport 300 away from generator transport 200 along guide rails 705 (FIGS. 7B, 7C, 7D) and disconnect the fifth-wheel connection 710 such that intake 306 of gas turbine 305 is unmated from inlet plenum 205 of generator transport 200; and separately and independently move generator transport 200, gas turbine transport 300 (300'), and air handling transport 400 in the transportation mode. Method 1000 may then move to block 1025 to remove the mobile source of electricity from the location after mobile power is no longer needed.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system for providing mobile electric power, the system comprising:
    a first transport including an inlet plenum and a generator;
    a second transport including a gas turbine, and a turbine exhaust unit; and
    a third transport including a generator exhaust air handling system, a combustion air handling system, and a turbine enclosure air handling system,
    wherein the first transport, the second transport, and the third transport are separate transports that are independently movable in a transportation mode,
    wherein, in an operation mode, the first transport and the second transport are connected to each other such that a first end side of the first transport faces and is connected to a first end side of the second transport, and the inlet plenum mounted on the first transport is connected to an intake of the gas turbine mounted on the second transport, and
    wherein, in the operation mode, the third transport is positioned at a predetermined distance relative to the connected first and second transports such that a first longitudinal side of the third transport faces a first longitudinal side of the first transport and a first longitudinal side of the second transport.

2. The system of claim 1, wherein the inlet plenum is disposed on the first longitudinal side of the first transport, and the first transport further includes a generator exhaust air outlet port disposed on the first longitudinal side of the first transport.

3. The system of claim 2, wherein the second transport further includes a plurality of turbine enclosure ventilation and cooling air intake ports disposed on the first longitudinal side of the second transport.

4. The system of claim 3, wherein the generator exhaust air handling system includes a generator exhaust air intake port, wherein the combustion air handling system includes a combustion air outlet port, and wherein the turbine enclosure air handling system includes a plurality of turbine enclosure ventilation and cooling air outlet ports, and
    wherein the generator exhaust air intake port, the combustion air outlet port, and the plural turbine enclosure ventilation and cooling air outlet ports are all disposed on the first longitudinal side of the third transport.

5. The system of claim 4, wherein in the operation mode, and in between the first longitudinal side of the third transport, and the first longitudinal sides of the first and second transports, the generator exhaust air outlet port of the first transport is fluidly connected to the generator exhaust air intake port of the third transport, the inlet plenum of the first transport is fluidly connected to the combustion air outlet port of the third transport, and the plural turbine enclosure ventilation and cooling air intake ports of the second transport are fluidly connected to the plural turbine enclosure ventilation and cooling air outlet ports of the third transport.

6. The system of claim 5, wherein the generator exhaust air outlet port of the first transport is fluidly connected to the generator exhaust air intake port of the third transport via one or more first expansion connections, the inlet plenum of the first transport is fluidly connected to the combustion air outlet port of the third transport via one or more second expansion connections, and the plural turbine enclosure ventilation and cooling air intake ports of the second transport are fluidly connected to the plural turbine enclosure ventilation and cooling air outlet ports of the third transport via third expansion connections.

7. The system of claim 6, wherein the one or more first expansion connections are sandwiched between the generator exhaust air outlet port of the first transport and the generator exhaust air intake port of the third transport, the one or more second expansion connections are sandwiched between the inlet plenum of the first transport and the combustion air outlet port of the third transport, and the third expansion connections are sandwiched between the plural turbine enclosure ventilation and cooling air intake ports of the second transport and the plural turbine enclosure ventilation and cooling air outlet ports of the third transport.

8. The system of claim 4, wherein the combustion air handling system includes a combustion air inlet filter housing disposed on the third transport, the combustion air inlet filter housing including a plurality of inlets and a plurality of filters to filter ambient air flowing into the combustion air inlet filter housing from the plurality of inlets, and wherein the combustion air outlet port outputs air filtered by the combustion air inlet filter housing to the inlet plenum of the first transport in the operation mode.

9. The system of claim 4, wherein the turbine enclosure air handling system includes a turbine enclosure air inlet filter housing disposed on the third transport, the turbine enclosure air inlet filter housing including a plurality of inlets and a plurality of filters to filter ambient air flowing into the turbine enclosure air inlet filter housing from the plurality of inlets, and wherein the plural turbine enclosure ventilation and cooling air outlet ports output air filtered by the turbine enclosure air inlet filter housing to the plural turbine enclosure ventilation and cooling air intake ports of the second transport in the operation mode.

10. The system of claim 1, wherein a power generation capacity of the gas turbine and the generator of the system in the operation mode is between 5 and 60 megawatts.

11. The system of claim 1, wherein the turbine exhaust unit is a horizontal exhaust that is fixedly mounted to a base frame of the second transport, and wherein the horizontal exhaust includes a plurality of silencers disposed in an interior thereof, and the horizontal exhaust is adapted to receive exhaust thrust air from an outlet of the gas turbine and output the exhaust thrust air through a roof of an enclosure of the second transport.

12. The system of claim 1, wherein the turbine exhaust unit is a movable exhaust stack that includes a first portion and a second portion, the second portion being movable relative to the first portion between first and second positions such that the second portion in the first position is lowered on the second transport, and the second portion in the second position is raised on the second transport, aligned and mated with the first portion, and pointing the second portion vertically.

13. The system of claim 12, wherein the first portion is mounted to a base frame of the second transport and houses therein an exhaust collector that is coupled to an outlet of the gas turbine, and wherein in the operation mode, where the second portion is in the second position, the exhaust collector and the exhaust stack define a vertical exhaust passage for exhaust thrust air output from the gas turbine.

14. The system of claim 12, wherein the second portion is mounted to a base frame of the second transport via a hinge, and wherein the second transport further includes a hydraulic system for moving the second portion between the first and second positions.

15. The system of claim 12, wherein the first portion includes a fixed exhaust connector, and the movable second portion includes a gas turbine exhaust and an exhaust extension configured for noise control, and wherein in the second position, the gas turbine exhaust of the second portion is aligned and mated with the exhaust connector that is fixedly mounted to a base frame of the second transport.

16. The system of claim 1, wherein the second transport comprises a base frame, and a sub-frame pivotally mounted to the base frame, wherein the gas turbine is mounted to the sub-frame, and
wherein the first transport includes guide rails that are adapted to mate with the base frame of the second transport during the operation mode, such that the first end side of the first transport is connected and mated to the first end side of the second transport.

17. The system of claim 16, further comprising a connection control system to perform an automatic leveling operation of the connected and mated first and second transports, wherein the connection control system includes a leveling system mounted on both the first and second transports, and a control system.

18. The system of claim 17, wherein the leveling system includes a plurality of support feet, a plurality of inclinometers, and a plurality of actuators mounted on the first and second transports, and wherein based on sensor data received from the plurality of inclinometers, the control system controls the plurality of actuators to move the plurality of support feet, and elevate and level the connected first and second transports together as a combined first and second transport.

19. The system of claim 18, wherein the connection control system further includes one or more sensors disposed at one or more locations of the first and second transports, and a pivoting mechanism to pivot the sub-frame relative to the base frame of the second transport, and
wherein the connection control system is further configured to perform an automatic precise alignment operation by utilizing the one or more sensors to obtain sensor data, and control the pivoting mechanism based on the obtained sensor data to pivot the sub-frame on the second transport that mounts the gas turbine to precisely align the gas turbine to a drive line of the generator disposed on the first transport.

20. The system of claim 19, wherein the one or more sensors include one or more laser level sensors, and wherein the pivoting mechanism includes one or more electric motors and one or more screw aligners that move the sub-frame relative to the base frame of the second transport.

21. The system of claim 20, wherein the third transport further comprises a hydraulic walking system that includes a plurality of outriggers and support feet and corresponding plurality of actuators to lift and move the third transport, such that the first longitudinal side of the third transport is positioned at a predetermined position relative to the first longitudinal sides of the first and second transports.

22. A method of converting a mobile source of electricity from a transportation mode to an operation mode, the mobile source of electricity comprising a first transport including an inlet plenum and a generator, a second transport including a gas turbine and a turbine exhaust unit, and a third transport including a generator exhaust air handling system, a combustion air handling system, and a turbine enclosure air handling system, the method comprising:
backing the second transport into the first transport such that a base frame of the second transport is mated with and slides into a guide rail disposed on a base frame of the first transport, and such that a first end side of the second transport is connected and locked with a first end side of the first transport;
coupling, with a coupling member, an intake of the gas turbine disposed on a sub-frame pivotally mounted to the base frame of the second transport to the inlet plenum disposed on the first transport, to thereby combine and lock the first and second transports into a combined first-and-second transport;
performing an automatic leveling operation for the combined first-and-second transport by operating a plurality of inclinometers to obtain sensor data, and operating a plurality of actuators based on the obtained sensor data to move a plurality of support feet disposed on the first and second transports; and
performing an automatic precise alignment operation for the combined first-and-second transport by utilizing one or more sensors disposed at one or more locations of the first and second transports to obtain sensor data, and controlling a pivoting mechanism based on the obtained sensor data to pivot the sub-frame that mounts the gas turbine on the second transport and precisely align the gas turbine disposed on the second transport to a drive line of the generator disposed on the first transport.

23. The method of claim 22, wherein the one or more sensors include one or more laser level sensors, and wherein the pivoting mechanism includes one or more electric motors and one or more screw aligners that move the sub-frame relative to the base frame of the second transport.

24. The method of claim 22, further comprising operating a hydraulic walking system disposed on the third transport to lift and move the third transport and position a first longitudinal side of the third transport at a predetermined position relative to a first longitudinal side of the combined first-and-second transport.

25. The method of claim 24, further comprising:
operating one or more first expansion connections to move and fluidly connect a generator exhaust air outlet port disposed on the first longitudinal side of the combined first-and-second transport to a generator exhaust air intake port disposed on the first longitudinal side of the third transport;
operating one or more second expansion connections to move and fluidly connect the inlet plenum disposed on the first longitudinal side of the combined first-and-second transport to a combustion air outlet port disposed on the first longitudinal side of the third transport; and
operating third expansion connections to move and fluidly connect plural turbine enclosure ventilation and cooling air intake ports disposed on the first longitudinal side of the combined first-and-second transport to plural turbine enclosure ventilation and cooling air outlet ports disposed on the first longitudinal side of the third transport.

26. An air handling transport comprising:
a generator exhaust air handling system including a first air box, a generator exhaust air intake port disposed on a first longitudinal facing side of the air handling transport and fluidly connected to the first air box, a plurality of silencers disposed in an interior of the first air box, and an outlet disposed on a roof of an enclosure of the air handling transport and fluidly connected to the first air box;
a combustion air handling system including a second air box, one or more inlets to the second air box, the one or more inlets being disposed on a second longitudinal side of the air handling transport that is opposite to the first longitudinal facing side, a plurality of filters to filter ambient air flowing into the second air box from the one or more inlets thereof, and a combustion air outlet port disposed on the first longitudinal facing side and fluidly connected to the second air box; and
a turbine enclosure air handling system including a third air box, one or more inlets to the third air box, the one or more inlets being disposed on the second longitudinal side of the air handling transport, a plurality of filters to filter ambient air flowing into the third air box from the one or more inlets thereof, and a plurality of turbine enclosure and cooling air outlet ports disposed on the first longitudinal facing side and fluidly connected to the third air box,
wherein the first longitudinal facing side of the air handling transport is adapted to face a first longitudinal facing side of a generator transport and a first longitudinal facing side of a gas turbine transport, and
wherein the generator transport, the gas turbine transport, and the air handling transport are separate transports that are independently movable in a transportation mode.

27. The air handling transport of claim 26, wherein:
the generator exhaust air handling system is adapted to intake generator exhaust air from the generator exhaust air intake port for ventilating an enclosure of the generator transport and for cooling heat radiated from a generator disposed on the generator transport, and output the generator exhaust air from the outlet disposed on the roof of the air handling transport,
the combustion air handling system is adapted to intake the ambient air as combustion air from the one or more inlets to the second air box, filter the intake combustion air, and output the filtered combustion air from the combustion air outlet port for input to an intake of a gas turbine disposed on the gas turbine transport, and
wherein the turbine enclosure air handling system is adapted to intake the ambient air as turbine enclosure ventilation and cooling air from the one or more inlets to the third air box, filter the intake turbine enclosure ventilation and cooling air, and output the filtered turbine enclosure ventilation and cooling air from the plural turbine enclosure ventilation and cooling air outlet ports for input to intake ports of an enclosure of the gas turbine transport for ventilating the enclosure of the gas turbine transport and for cooling heat radiated from an external surface of the gas turbine disposed on the gas turbine transport.

28. A system for providing mobile electric power, the system comprising:
a generator transport including an inlet plenum and a generator;
a gas turbine transport including a gas turbine and a turbine exhaust unit; and
an air handling transport including a generator exhaust air handling system, a combustion air handling system, and a turbine enclosure air handling system,
wherein, in an operation mode, the air handling transport is positioned at a predetermined distance relative to the generator transport and the gas turbine transport such that a first longitudinal side of the air handling transport faces a first longitudinal side of the generator transport and faces a first longitudinal side of the gas turbine transport,
wherein in the operation mode, the system defines a generator exhaust air flow path, a combustion air flow path, and a turbine enclosure ventilation and cooling air flow path, and
wherein the generator exhaust air flow path: begins at a roof of an enclosure of the generator transport, extends through and ventilates an interior of the enclosure of the generator transport, cools radiant heat of the generator disposed in the interior of the enclosure of the generator transport, exits the generator transport through an outlet port disposed on the first longitudinal side of the generator transport, enters the air handling transport through an intake port disposed on the first longitudinal side of the air handling transport, and exits the system through an outlet disposed on a roof of an enclosure of the air handling transport.

29. The system of claim 28, wherein the combustion air flow path: begins at one or more inlets disposed on a second longitudinal side of the air handling transport that is opposite to the first longitudinal side thereof, passes through one or more filters disposed at the one or more inlets to filter incoming air, passes through an interior of a combustion air box defined in the enclosure of the air handling transport, exits the air handling transport through an outlet port of the combustion air box disposed on the first longitudinal side of the air handling transport, enters the generator transport through the inlet plenum disposed on the first longitudinal side of the generator transport, enters the gas turbine transport through an intake of the gas turbine that is coupled to the inlet plenum, passes through the gas turbine on the gas turbine transport, enters a horizontal exhaust disposed on the gas turbine transport and coupled to an outlet of the gas turbine, and exits the system through a roof of an enclosure of the gas turbine transport.

30. The system of claim 29, wherein the turbine enclosure ventilation and cooling air flow path: begins at one or more inlets disposed on the second longitudinal side of the air handling transport, passes through one or more filters disposed at the one or more inlets to filter incoming air, passes through an interior of a turbine enclosure air box defined in the enclosure of the air handling transport, exits the air handling transport through outlet ports of the turbine enclosure air box disposed on the first longitudinal side of the air handling transport, enters the gas turbine transport through intake ports of the enclosure of the gas turbine transport, passes through and ventilates an interior of the enclosure of the gas turbine transport, cools radiated heat from an external surface of the gas turbine disposed in the interior of the enclosure of the gas turbine transport, enters the horizontal exhaust disposed on the gas turbine transport, and exits the system through the roof of the enclosure of the gas turbine transport.

31. The system of claim 28, wherein the combustion air flow path: begins at one or more inlets disposed on a second longitudinal side of the air handling transport that is opposite to the first longitudinal side thereof, passes through one or more filters disposed at the one or more inlets to filter incoming air, passes through an interior of a combustion air box defined in the enclosure of the air handling transport, exits the air handling transport through an outlet port of the combustion air box disposed on the first longitudinal side of the air handling transport, enters the generator transport through the inlet plenum disposed on the first longitudinal side of the generator transport, enters the gas turbine transport through an intake of the gas turbine that is coupled to the inlet plenum, passes through the gas turbine on the gas turbine transport, enters an exhaust collector disposed on the gas turbine transport and connected to an outlet of the gas turbine, enters a vertical exhaust stack connected to the exhaust collector, and exits the system through a top of the vertical exhaust stack.

32. The system of claim 31, wherein the turbine enclosure ventilation and cooling air flow path: begins at one or more inlets disposed on a second longitudinal side of the air handling transport, passes through one or more filters disposed at the one or more inlets to filter incoming air, passes through an interior of a turbine enclosure air box defined in the enclosure of the air handling transport, exits the air handling transport through outlet ports of the turbine enclosure air box disposed on the first longitudinal side of the air handling transport, enters the gas turbine transport through intake ports of an enclosure of the gas turbine transport, passes through and ventilates an interior of the enclosure of the gas turbine transport, cools radiated heat from an external surface of the gas turbine disposed in the interior of the enclosure of the gas turbine transport, flows around an outer surface of the vertical exhaust stack, and exits the system through a peripheral opening on a roof of the enclosure of the gas turbine transport.

* * * * *